US012296391B2

(12) United States Patent
Grigorenko et al.

(10) Patent No.: US 12,296,391 B2
(45) Date of Patent: May 13, 2025

(54) SECURITY ELEMENT

(71) Applicant: BASF SE, Ludwigshafen am Rhein (DE)

(72) Inventors: Nikolay A. Grigorenko, Basel (CH); Michelle Richert, Basel (CH)

(73) Assignee: BASF SE, Ludwigshafen am Rhein (DE)

( * ) Notice: Subject to any disclaimer, the term of this patent is extended or adjusted under 35 U.S.C. 154(b) by 607 days.

(21) Appl. No.: 17/424,607

(22) PCT Filed: Jan. 20, 2020

(86) PCT No.: PCT/EP2020/051284

§ 371 (c)(1),
(2) Date: Jul. 21, 2021

(87) PCT Pub. No.: WO2020/156858

PCT Pub. Date: Aug. 6, 2020

(65) Prior Publication Data

US 2022/0088957 A1 Mar. 24, 2022

(30) Foreign Application Priority Data

Jan. 29, 2019 (EP) .................................... 19154082

(51) Int. Cl.

| | |
|---|---|
| ***B22F 7/04*** | (2006.01) |
| ***B22F 1/054*** | (2022.01) |
| ***B42D 25/373*** | (2014.01) |
| ***B42D 25/382*** | (2014.01) |
| ***B42D 25/45*** | (2014.01) |
| ***C09D 11/033*** | (2014.01) |
| ***C09D 11/037*** | (2014.01) |
| ***C09D 11/14*** | (2006.01) |

(52) U.S. Cl.

CPC ................ *B22F 7/04* (2013.01); *B22F 1/054* (2022.01); *B22F 1/0551* (2022.01); *B22F 1/056* (2022.01); *B42D 25/373* (2014.10); *B42D 25/382* (2014.10); *B42D 25/45* (2014.10); *C09D 11/033* (2013.01); *C09D 11/037* (2013.01); *C09D 11/14* (2013.01)

(58) Field of Classification Search

None

See application file for complete search history.

(56) References Cited

U.S. PATENT DOCUMENTS

| | | | |
|---|---|---|---|
| 3,862,333 | A | 1/1975 | Chalupa et al. |
| 4,151,175 | A | 4/1979 | Crivello et al. |
| 4,399,071 | A | 8/1983 | Crivello et al. |
| 4,652,015 | A | 3/1987 | Crane |
| 4,694,029 | A | 9/1987 | Land |
| 4,950,581 | A | 8/1990 | Koike et al. |
| 5,068,008 | A | 11/1991 | Crane |
| 5,324,079 | A | 6/1994 | Kaule et al. |
| 6,306,555 | B1 | 10/2001 | Schulz et al. |
| 2007/0281140 | A1 | 12/2007 | Haubrich et al. |
| 2010/0053608 | A1 | 3/2010 | Lee |
| 2011/0319535 | A1 | 12/2011 | Nesvadba et al. |
| 2014/0085725 | A1 | 3/2014 | Lochbihler et al. |
| 2017/0139087 | A1 | 5/2017 | Boutami et al. |
| 2017/0368866 | A1 | 12/2017 | Seydel et al. |
| 2018/0086921 | A1* | 3/2018 | Grigorenko ............ B41M 7/009 |

FOREIGN PATENT DOCUMENTS

| | | | |
|---|---|---|---|
| CN | 106891637 | A | 6/2017 |
| CN | 107538957 | A | 1/2018 |
| DE | 102015005446 | A1 | 11/2016 |
| DE | 102015014505 | A1 | 5/2017 |
| EP | 0021350 | A1 | 1/1981 |
| EP | 0092269 | A1 | 10/1983 |
| EP | 0185396 | A2 | 6/1986 |
| EP | 0303725 | A1 | 2/1989 |
| EP | 0319157 | A2 | 6/1989 |
| EP | 0518740 | A1 | 12/1992 |
| EP | 0562897 | A1 | 9/1993 |
| EP | 0608078 | A1 | 7/1994 |
| EP | 0624826 | A1 | 11/1994 |
| EP | 1498545 | A1 | 1/2005 |
| JP | 10-301276 | A | 11/1998 |

(Continued)

OTHER PUBLICATIONS

International Search Report and Written Opinion received for PCT Patent Application No. PCT/EP2020/051284, mailed on Apr. 30, 2020, 11 pages.

*Primary Examiner* — Sheeba Ahmed

(74) *Attorney, Agent, or Firm* — Faegre Drinker Biddle & Reath LLP

(57) ABSTRACT

The present invention relates to security elements, comprising (a) a substrate, (b) on at least part of the substrate surface a metal layer, (c) optionally on at least part of the metal layer a dielectric layer, (d) on at least part of the metal layer, or the dielectric layer, a layer obtained by overcoating the metal layer, or the dielectric layer with a composition, comprising (i) silver nanoparticles, (ii) a solvent, (iii) (surface) stabilizing agent(s) and (iv) optionally a binder, and (e) a protective layer on top of layer (d). The maximum absorption wavelength of the silver nanoparticles in layer (d) is controlled by the amount of (surface) stabilizing agent(s) and optionally binder relative to the amount of silver nanoparticles to be preferably in the range of 700 to 1600 nm.

17 Claims, 3 Drawing Sheets

(56) References Cited

FOREIGN PATENT DOCUMENTS

| | | | |
|---|---|---|---|
| WO | 90/01512 | A1 | 2/1990 |
| WO | 90/08367 | A1 | 7/1990 |
| WO | 92/11142 | A1 | 7/1992 |
| WO | 96/04143 | A1 | 2/1996 |
| WO | 96/39685 | A1 | 12/1996 |
| WO | 98/19866 | A1 | 5/1998 |
| WO | 98/46647 | A1 | 10/1998 |
| WO | 2006/008251 | A2 | 1/2006 |
| WO | 2010/049676 | A1 | 5/2010 |
| WO | 2010/108837 | A1 | 9/2010 |
| WO | 2011/064162 | A2 | 6/2011 |
| WO | 2013/186167 | A2 | 12/2013 |
| WO | 2014/041121 | A1 | 3/2014 |
| WO | 2014/177448 | A1 | 11/2014 |
| WO | 2014/187750 | A1 | 11/2014 |
| WO | 2015/113718 | A1 | 8/2015 |
| WO | 2016/173695 | A1 | 11/2016 |
| WO | 2016/173696 | A1 | 11/2016 |
| WO | 2017/005346 | A1 | 1/2017 |
| WO | 2017/080641 | A1 | 5/2017 |
| WO | 2017/135430 | A1 | 8/2017 |
| WO | 2018/210597 | A1 | 11/2018 |
| WO | 2020/083794 | A1 | 4/2020 |

* cited by examiner

SECURITY ELEMENT

CROSS-REFERENCE TO RELATED APPLICATIONS

This application is a national stage application (under 35 U.S.C. § 371) of PCT/EP2020/051284, filed Jan. 20, 2020, which claims benefit of European Application No. 19154082.2, filed Jan. 29, 2019, both of which are incorporated herein by reference in their entirety.

The present invention relates to security elements, comprising (a) a substrate, (b) on at least part of the substrate surface a metal layer, (c) optionally on at least part of the metal layer a dielectric layer, (d) on at least part of the metal layer, or the dielectric layer, a layer obtained by overcoating the metal layer, or the dielectric layer with a composition, comprising (i) silver nanoparticles, (ii) a solvent, (iii) (surface) stabilizing agent(s) and (iv) optionally a binder, and (e) a protective layer on top of layer (d). The maximum absorption wavelength of the silver nanoparticles in layer (d) is controlled by the amount of (surface) stabilizing agent(s) and optionally binder relative to the amount of silver nanoparticles to be preferably in the range of 700 to 1600 nm.

WO2010/108837 relates to shaped transition metal particles, in particular in the form of a dispersion in an aqueous and/or organic medium, the manufacture thereof and their use as an infrared (IR) absorbing agent, an IR curing agent for coatings, an additive in conductive formulations, an antimicrobial agent or for sensoring organic and/or inorganic compounds.

Maiken H. Mikkelsen et al., Adv. Mater. 2015, DOI: 10.1002/adma.201503281 describe absorbers based on colloidally synthesized silver nanocubes (L=75-140 nm) situated over a metal film (Au), separated by a well-controlled nanoscale spacer (polymer, d=1-7 nm). Reflection spectra of absorbers with resonances from the visible to the near-infrared are obtained using a range of nanocube sizes (L) and spacer layer thicknesses (d).

M. J. Rozin et al. Nature Commun. 6 (2015) 7325 discloses metasurfaces exhibiting extreme in-plane electromagnetic coupling that is strongly dependent on nanocrystal size, shape and spacing. The colloidal metasurfaces display near-ideal electromagnetic absorbance that can be tuned from the visible into the mid-infrared wavelengths. For example, NOM structure used 92 nm Ag nanocubes supported on a 50 nm Au thin-film by a 3 nm dielectric spacer height with varying domain sizes of g=2.75±1.80, 2.81±1.87, 3.6±1.41, and 13.22±4.76 nanocubes.

Yan Cui et al. Chem. Commun. 51 (2015) 5363-5366 demonstrate a multiplex plasmonic anti-counterfeiting platform by embedding multiple molecules on a single substrate with superior nanometer scale spectral and spatial resolution. The encoded specific molecular information can be read out only using Raman spectroscopy.

US2010053608 relates to a device comprising: a tactile sensing element comprising: a nanoparticle layer comprising metal nanoparticles, and a metal film disposed relative to the nanoparticle layer, wherein a change in a surface plasmon resonance (SPR) spectrum of light scattered from the nanoparticle layer occurs in response to a local pressure applied to the metal film; and a spectrometer comprising an array of photodetectors configured to receive the light scattered from various portions of the nanoparticle layer.

US2014085725 discloses a two-dimensionally periodic, color-filtering grating, comprising a contiguous high-refractive including a metallic ground layer defining a grating plane and above the ground layer a two-dimensionally regular pattern of individual high-refractive including metallic areal elements that respectively extend parallel to the grating plane and respectively are spaced apart from the ground layer through an intermediate dielectric by a distance greater than the thickness of the ground and of the areal elements, wherein the regular pattern has in at least two directions, which run parallel to the grating plane, a periodicity between 100 nm and 800 nm.

WO17005346 relates to a security element for a valuable document, wherein the security element (1) comprises a two-dimensionally regular pattern (6) of individual cylindrical surface elements (3) composed of high refractive index, more particularly metallic, material, which lie in a grating plane (7), are spaced apart from one another by gaps (4) and are embedded into a dielectric (2, 5) on all sides, wherein the regular pattern (6) has a periodicity (d) of 100 nm to 800 nm, preferably of 200 nm to 500 nm, in at least two directions running parallel to the grating plane, wherein the gaps (4) between the surface elements (3) likewise comprise only dielectric (2, 5) in a region of at least 1 micro m perpendicular to the grating plane (7).

WO15113718 relates to a plasmonic optical security component comprising two layers (2, 4) made of transparent dielectric material and a metal layer (3) arranged between said transparent dielectric material layers in order to form two dielectric-metal interfaces (31, 32). The metal layer is structured to form, on a first coupling region, a first periodic, two-dimensional coupling array (C1) which is capable of coupling surface plasmon modes, which are supported by said dielectric-metal interfaces, to an incident light ray, the first coupling array having a profile which does not have point symmetry in any of the directions thereof, and, on a second coupling region, a second periodic, two-dimensional coupling array (C2) which is capable of coupling surface plasmon modes, which are supported by said dielectric-metal interfaces, to an incident light ray, the second coupling array having a profile which does not have point symmetry in any of the directions thereof and is different from that of the first coupling array.

US2017139087 discloses a plasmonic optical filter comprising: a periodic repetition of metal slabs above a metal surface; dielectric spacers arranged between the slabs and the metal surface so that there exists an empty space between each slab and the metal surface; and an opening between each of said empty spaces and the outside.

WO2011/064162 discloses a security, or decorative element, comprising a substrate, which may contain indicia or other visible features in or on its surface, and on at least part of the said substrate surface, a coating comprising platelet shaped transition metal particles having a longest dimension of edge length of from 15 nm to 1000 nm, preferably from 15 nm to 600 nm and particularly from 20 nm to 500 nm, and a thickness of from 2 nm to 100 nm, preferably from 2 to 40 nm and particularly from 4 to 30 nm.

WO2013/186167 discloses a method for forming a surface relief microstructure, especially an optically variable image (an optically variable device, OVD) on a substrate comprising the steps of:

A) applying a curable composition to at least a portion of the substrate wherein the curable composition comprises a1) at least one ethylenically unsaturated resin, a monomer or a mixture thereof;

a2) at least one photoinitiator; and a3) a metal pigment which is in the form of platelet shaped transition metal particles having a longest dimension of edge length of from 5 nm to 1000 nm, preferably from 7 nm to 600 nm and particularly from 10 nm to 500 nm, and a thickness of from 1 nm to 100 nm, preferably from 2 to 40 nm and particularly from 3 to 30 nm;

B) contacting at least a portion of the curable composition with a surface relief microstructure, especially optically variable image forming means;

C) curing the composition by using at least one UV lamp.

WO2014/041121 relates to a security element, comprising a) a substrate, b) a component with refractive index modulation, in particular a volume hologram, which is obtainable by exposing a recording material to actinic radiation and thereon, c) a coating on at least a portion of the refractive index modulated layer comprising platelet shaped transition metal particles having a longest dimension of edge length of from 15 nm to 1000 nm, preferably from 15 nm to 600 nm and particularly from 20 nm to 500 nm, and a thickness of from 2 nm to 100 nm, preferably from 2 to 40 nm and particularly from 4 to 30 nm.

WO2014/187750 relates to a security element, comprising a) a substrate, b) a coating on at least a portion of the substrate comprising at least one liquid crystal compound, the coating being applied, on the reverse side of the substrate if the substrate is transparent or translucent or on the surface side if the substrate is transparent, translucent, reflective or opaque and c) a further coating on at least a portion of the coating containing the liquid crystal compound or direct on the substrate if the coating containing the liquid crystal compound is placed on the reverse side of the substrate, the further coating comprising platelet shaped transition metal particles having a longest dimension of edge length of from 5 nm to 1000 nm, preferably from 5 nm to 600 nm and particularly from 10 nm to 500 nm, and a thickness of from 2 nm to 100 nm, preferably from 2 to 40 nm and particularly from 4 to 30 nm.

WO16173696 (DE102015005446A1) relates to a security element for security papers, value documents, or the like, which consists of a multilayer structure capable of interference, wherein the multilayer structure capable of interference has a reflection layer, a dielectric layer, and a partially transparent layer, wherein the dielectric layer is arranged between the reflection layer and the partially transparent layer, wherein the reflection layer is formed by a colored layer, which comprises platelet shaped transition metal particles having a longest dimension of edge length of from 15 nm to 1000 nm and a thickness of from 2 nm to 100 nm, so that the colored layer exhibit a metallic shade in incident light and a colorful shade in transmitted light.

WO2017080641 (DE102015014505A1) relates to a security element for securing documents of value, comprising a transparent carrier substrate and a first semi-transparent function layer, which has a multi-layer structure having a first semi-transparent metal layer, a second semi-transparent metal layer, and a dielectric layer arranged between the first and the second semi-transparent metal layers, wherein the second semi-transparent metal layer at least partially has a layer thickness greater than the layer thickness of the first semi-transparent metal layer.

WO17135430A1 relates to a plasmonic structure (100) which is provided with a reflection surface (104), a dielectric layer (102), and at least one protrusion (101). The dielectric layer (102) is layered on the reflection surface (104). The protrusion (101) is disposed on the dielectric layer (102). The materials used to form the reflection surface (104), the dielectric layer (102), and the protrusion (101), the thickness of the dielectric layer (102), the height and shape of the protrusion (101), and the size of the interface (106) between the protrusion (101) and the dielectric layer (102) are controlled so that surface plasmon resonance is induced at the interface (106) and light in a specific wavelength range undergoes plasmon absorption at the interface (106).

It has now been found, surprisingly, that the maximum absorption wavelength of silver nanoparticles can be controlled just by varying the amount of non-volatile (surface) stabilizing agent(s) and optionally binder relative to the amount of silver nanoparticles in the dry coating over the metal layer.

Accordingly, the present application relates to security elements, comprising (a) a substrate, which may contain indicia or other visible features in or on its surface, and (b) on at least part of the substrate surface a metal layer having a thickness of from 5 to 1000 nm, especially 10 to 500 nm, (c) optionally on at least part of the metal layer a dielectric layer having a thickness of 1 to 20 nm, especially 2 to 10 nm, (d) on at least part of the metal layer, or the dielectric layer, a layer obtained by overcoating the metal layer, or the dielectric layer with a composition, comprising (i) silver nanoparticles having an average diameter of from 5 to 500 nm, especially 20 nm to 500 nm, (ii) a solvent, (iii) (surface) stabilizing agent(s), and (iv) optionally a binder, and (e) a protective layer on top of layer (d). The maximum absorption wavelength of the silver nanoparticles in layer (d) is controlled by varying the amount of (surface) stabilizing agent(s) and optionally binder relative to the amount of silver nanoparticles.

"Control" means that the interaction of the silver nanoparticles with the metal layer (b) and optionally the dielectric layer (c) produces dependent on the amount of (surface) stabilizing agent(s) (iii) and optionally the binder (iv) a shift of the maximum absorption wavelength of the silver nanoparticles, in particular from the VIS range (400-750 nm) to the NIR range (750 to 1600 nm).

In particular the amount of (surface) stabilizing agent(s) and optionally binder relative to the amount of silver nanoparticles is such that the maximum absorption wavelength of the silver nanoparticles in layer (d) is in the range of 700 to 1600 nm, very especially in the range of 750 to 1400 nm.

For example, coatings on aluminum foils obtained from compositions containing 0.92% by weight silver nanoplatelets and 0.08% by weight (surface) stabilizing agent(s) and different amounts of nitrocellulose (0, 0.1 and 0.5% by weight, respectively) show absorption maxima of the silver nanoplatelets of ca. 940 nm, ca. 720 nm and ca. 600 nm, respectively.

Preferably, layer (d) is colorless, or nearly colorless in the visible range of the electromagnetic spectrum.

Figure 1:
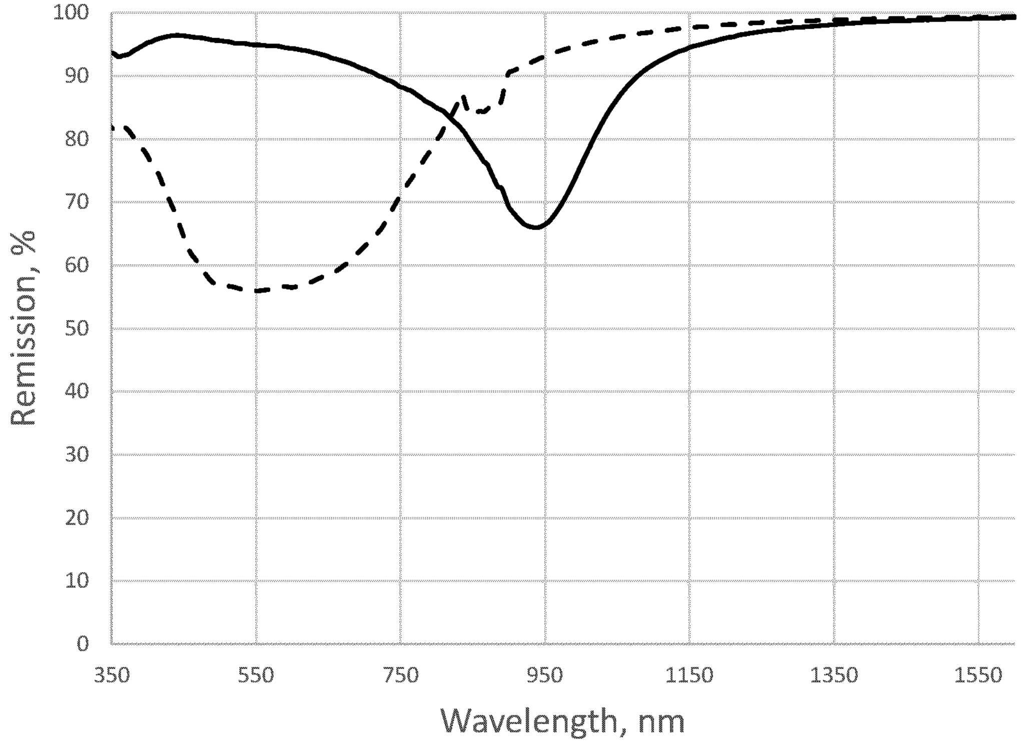
FIG. 1 shows reflection spectra of coatings obtained with Ink 1 (weight ratio of (surface) stabilizing agent(s) to silver nanoparticles=8.7% w/w, amount of binder=0% w/w; absorption maximum at ca. 940 nm).
Figure 2:
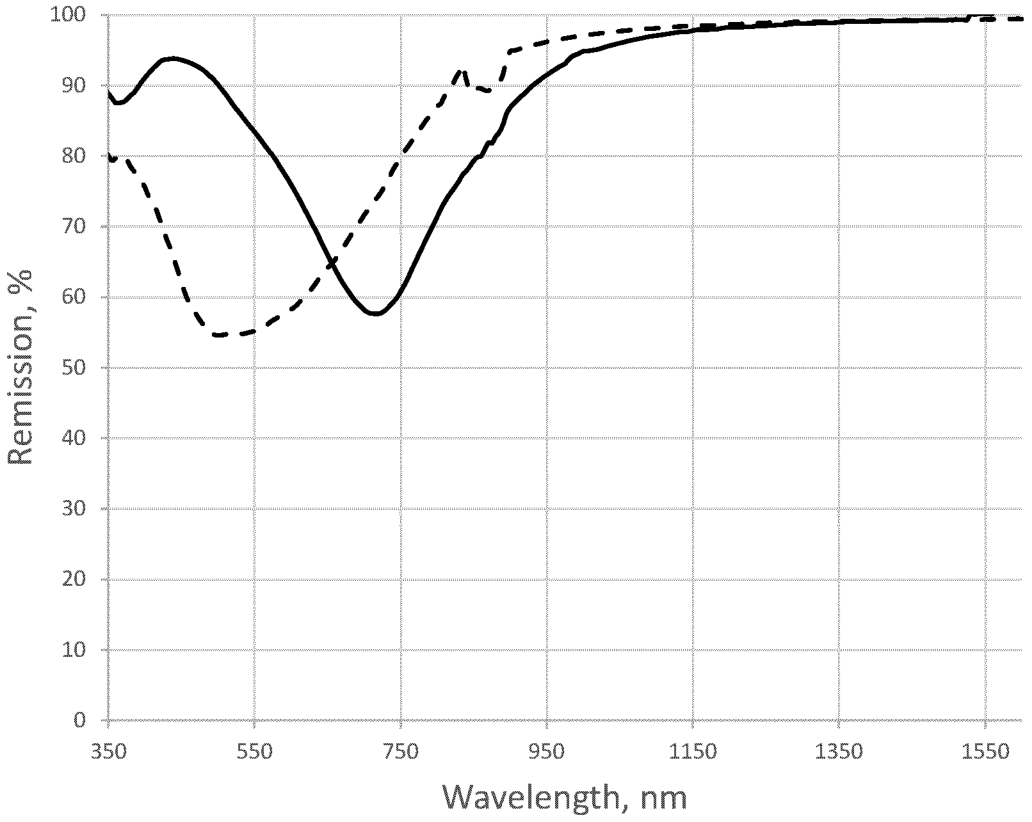
FIG. 2 shows reflection spectra of coatings obtained with Ink 2 (weight ratio of (surface) stabilizing agent(s) to silver nanoparticles=8.7% w/w, weight ratio of binder to silver nanoparticles=10.9% w/w; absorption maximum at ca. 720 nm).
Figure 3:
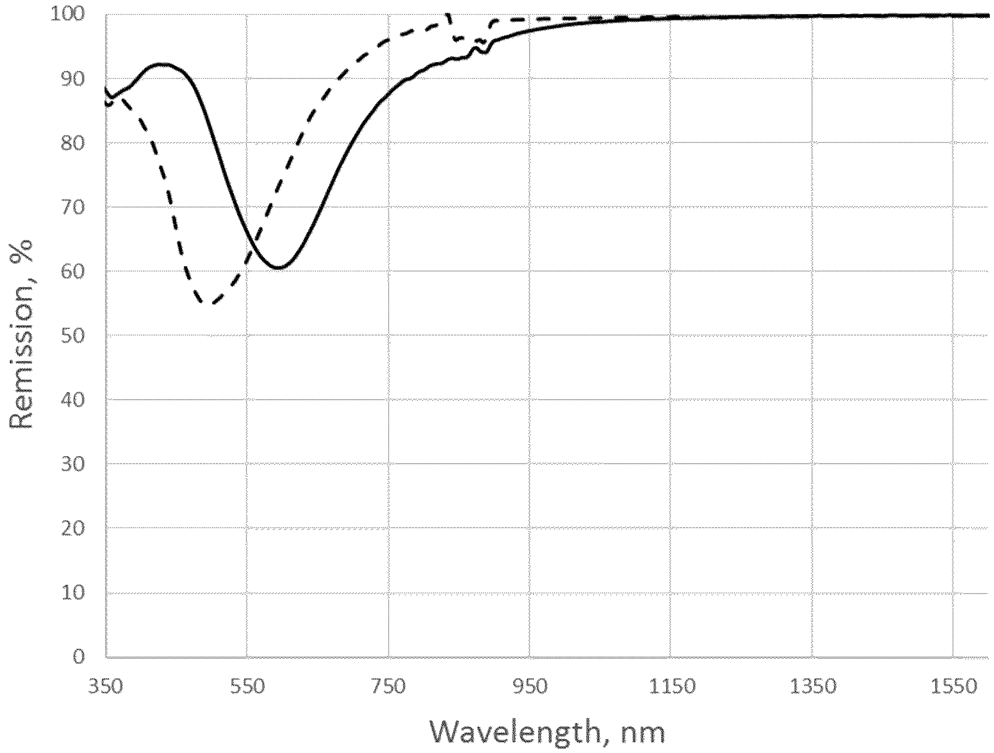
FIG. 3 shows reflection spectra of coatings obtained with Ink 3 (weight ratio of (surface) stabilizing agent(s) to silver nanoparticles=8.7% w/w, weight ratio of binder to silver nanoparticles=54.3%; absorption maximum at ca. 600 nm).

The amount of (surface) stabilizing agent(s) in layer (d) relative to the amount of silver nanoparticles is preferably from 0.1 to 20% by weight of (surface) stabilizing agent(s) relative to the weight of silver nanoparticles.

The term "(surface) stabilizing agent(s)" relates to the surface stabilizing agent(s) and optionally stabilizing agent(s) adhered to the surface of the silver nanoparticles.

The amount of binder in layer (d) relative to the amount of silver nanoparticles is preferably from 0 to 60% by weight binder relative to the weight of silver nanoparticles.

The maximum absorption wavelength of the silver nanoparticles is usually controlled by varying the amount of (surface) stabilizing agent(s) relative to the amount of silver nanoparticles in layer d) from 0.1 to 20% by weight of (surface) stabilizing agent(s) relative to the weight of silver nanoparticles, especially from 0.5 to 15% by weight of (surface) stabilizing agent(s) relative to the weight of silver nanoparticles. In addition, the maximum absorption wavelength of the silver nanoparticles can be controlled by varying the amount of binder relative to the amount of silver nanoparticles in layer d) from 0 to 100% by weight of binder relative to the weight of silver nanoparticles, especially from 0 to 60% by weight of binder relative to the weight of silver nanoparticles.

Due to the simple buildup of the security element, which avoids the need to deposit a dielectric layer with precisely controlled thickness on top of the metal surface, and the variable maximum absorption wavelength of the silver nanoparticles a high protection against counterfeit is possible, making the element ideally suitable for banknotes, credit cards and the like.

As substrate (a) the usual substrates can be used. The substrate may comprise paper, leather, fabric such as silk, cotton, tyvac, filmic material or metal, such as aluminium. The substrate may be in the form of one or more sheets or a web. The substrate may comprise paper, fabric, man made fibres and polymeric compounds. The substrate may comprise any one or more selected from the group comprising paper, papers made from wood pulp or cotton or synthetic wood free fibres and board. The paper/board may be coated, calendared or machine glazed; coated, uncoated, mould made with cotton or denim content, Tyvac, linen, cotton, silk, leather, polythyleneterephthalate, Propafilm® polypropylene, polyvinylchloride, rigid PVC, cellulose, tri-acetate, acetate polystyrene, polyethylene, nylon, acrylic and polyetherimide board.

The paper substrate is selected from regular paper, banknote paper, synthetic paper, or a polymer banknote. Regular paper is made from wood pulp. Banknote paper is usually made from cotton. Synthetic paper contains a large part of synthetic resin derived from petroleum as its primary material. There are three major sub-classes of synthetic paper:

- film synthetic paper like Teslin® (PPG Industries; a microporous, highly filled, sinle layer, polyolefin synthetic material), or Yupo® (Covert-All, Inc.; an opaque white, multi-layered biaxially oriented polypropylene (BOPP) product);
- fibre synthetic paper (polymer fibres instead of wood fibres); and
- film laminated synthetic paper: paper/film/paper, such as, for example, Durasafe® (Landquart); film/paper/film, such as, for example Hybrid banknote substrate (Giesecke & Devrient; combination of protective polyester film around a cotton fiber core).

The term paper substrate also comprises polymer banknotes, such as, for example, Guardian® (CCL Secure, biaxially-oriented polypropylene (BOPP) core with white basecoat applied by gravure printing).

As materials for transparent substrates, explicit mention should be made here of polyethylene terephthalate, polyethylene naphthalate, polyvinyl butyral, polyvinyl chloride, flexible polyvinyl chloride, polymethyl methacrylate, poly (ethylene-co-vinyl acetate), polycarbonate, cellulose triacetate, polyether sulfone, polyester, polyamide, polyolefins, such as, for example, polypropylene, and acrylic resins. Among these, polyethylene terephthalate, polyvinyl butyral, polyvinyl chloride, flexible polyvinyl chloride and polymethyl methacrylate are preferred.

The flexible substrate is preferably biaxially oriented.

The flexible substrate is preferably selected from a biaxially oriented polyethylene terephthalate (BOPET) film, or a biaxially oriented polypropylene (BOPP) film.

The substrates being transparent films or non-transparent substrates like opaque plastic, paper including but not limited to banknote, voucher, passport, and any other security or fiduciary documents, self-adhesive stamp and excise seals, card, tobacco, pharmaceutical, computer software packaging and certificates of authentication, aluminium, and the like.

The substrates can be plain such as in metallic (e.g. Al foil) or plastic foils (e.g. PET foil), but paper is regarded also as a plain substrate in this sense. The aluminum foil may simultaneously represent the substrate (a) and the metal layer (b).

Non-plain substrates or structured substrates comprise a structure, which was intentionally created, such as a hologram, or any other structure, created, for example, by embossing.

As metal for the layer (b) the usual metals can be used. Examples are Al, Cr, Ni, Cu, Ag, Au and Pt. The metal is preferably Al, or Ag. Al is most preferred.

The metal layer has usually a thickness of from 5 to 1000 nm, especially 10 to 500 nm.

The dielectric layer (c) is optional. If it is present on the metal layer it has a thickness of 1 to 20 nm, especially 2 to 10 nm. The dielectric layer (c) can consist of an organic, or inorganic material.

Examples of suitable materials for the dielectric layer include zinc sulfide (ZnS), zinc oxide (ZnO), zirconium oxide ($ZrO_2$), titanium dioxide ($TiO_2$), carbon (C), indium oxide ($In_2O_3$), indium-tin-oxide (ITO), tantalum pentoxide (Ta), cerium oxide ($CeO_2$), yttrium oxide ($Y_2O_3$), europium oxide ($Eu_2O_3$), iron oxides such as iron(III) oxide ($Fe_3O_4$) and ferric oxide ($Fe_2O_3$), hafnium nitride (HfN), hafnium carbide (HfC), hafnium oxide ($HfO_2$), lanthanum oxide (LaO), magnesium oxide (MgO), neodymium oxide (NdO), praseodymium oxide ($Pr_6O_n$), samarium oxide ($Sm_2O_3$), antimony trioxide ($Sb_2O_3$), silicon carbide (SiC), silicon nitride ($Si_3N_4$), silicon monoxide (SiO), selenium trioxide ($Se_2O_3$), tin oxide ($SnO_2$), tungsten trioxide ($WO_3$), silicon dioxide ($SiO_2$), aluminum oxide ($Al_2O_3$), metal fluorides such as magnesium fluoride ($MgF_2$), aluminum fluoride ($AiF_3$), cerium fluoride ($CeF_3$), lanthanum fluoride ($LaF_3$), sodium aluminum fluorides (e.g., $Na_3AlF_6$ or $Na_5Al_3F_{14}$), neodymium fluoride ($NdF_3$), samarium fluoride ($SmF_3$), barium fluoride ($BaF_2$), calcium fluoride ($CaF_2$), lithium fluoride (LiF), and combinations thereof.

In addition, organic polymers can be utilized as dielectric materials, including polydienes or polyalkenes, such as polyacrylates (e.g. polymethacrylate).

Preferably, the dielectric layer consists of $SiO_2$, or $Al_2O_3$. Natural oxide layers, such as $Al_2O_3$ in case of aluminum, are especially preferred, because no artificial dielectric layer needs to be applied.

It is widely known to use in banknotes security elements in the form of strips or threads.

Security elements in the form of strips or threads used in banknotes, which are made from a transparent film provided with a continuous reflective metal layer, vacuum deposited aluminium on polyester film being the commonest example may represent the substrate (a) and metal layer (b) of the security element of the present application, wherein the surface of the vacuum deposited aluminum is oxidized to $Al_2O_3$ (aluminum oxide) in the presence of oxygen (=layer (c)). Reference is made to US964014; U.S. Pat. Nos. 4,652,015; 5,068,008; 5,324,079; WO9008367; WO92/11142; WO96/04143; WO96/39685; WO98/19866; EP021350A1; EP0185396A2; EP303725A1; EP319157A2; EP518740A1; EP608078A1; EP1498545A1 and WO14177448 as well as the references cited therein.

In said embodiment the metal layer b) preferably consists of aluminum and the dielectric layer c) preferably consists of $Al_2O_3$.

The layer d) is obtained by coating the metal layer b), or the dielectric layer c) with a composition, comprising (i) silver nanoparticles having an average diameter of from 5 to 500 nm, especially 20 nm to 500 nm,
(ii) a solvent,
(iii) (surface) stabilizing agent(s), and
(iv) optionally a binder.

Advantageously, silver nanoplatelets described in PCT/EP2019/078469 (European patent application no. 18202669.0) can be used. PCT/EP2019/078469 relates to compositions, comprising silver nanoplatelets, wherein the mean diameter of the silver nanoplatelets, present in the composition, is in the range of 20 to 70 nm with standard deviation being less than 50% and the mean thickness of the silver nanoplatelets, present in the composition, is in the range of 5 to 30 nm with standard deviation being less than 50%. A coating, comprising the composition, shows a red, or magenta color in transmission and a greenish-metallic color in reflection.

The mean aspect ratio of the silver nanoplatelets is higher than 1.5.

The silver nanoplatelets may be in the form of disks, regular hexagons, triangles, especially equilateral triangles, and truncated triangles, especially truncated equilateral triangles, or mixtures thereof. They are preferably in the form of disks, truncated triangles, hexagons, or mixtures thereof.

In addition, PCT/EP2019/078469 also describes surface modified silver nanoparticles which bear a surface stabilizing agent of formula (I) and optionally further stabilizing agents described below on their surface.

The mean diameter of the silver nanoplatelets is in the range of 20 to 70 nm, preferably 25 to 65 nm, more preferably 35 to 55 nm. The standard deviation being less than 50%, preferably less than 40%.

The mean thickness of the silver nanoplatelets is in the range of 5 to 30 nm, preferably 7-25 nm, more preferably 8 to 25 nm. The standard deviation being less than 50%, preferably less than 40%.

The diameter is the longer side of the nanoplatelet (width). The thickness is the shorter side of the nanoplatelet (height).

The mean aspect ratio (defined as the ratio of mean diameter to mean thickness) being larger than 1.5, preferably larger than 1.6 and more preferably larger than 1.7.

The aspect ratio of the nanoparticles is the ratio of its longest dimension, such as, for example, its diameter to its shortest dimension, such as, for example, its thickness. For example, the aspect ratio of a disk is the ratio of its diameter to its thickness.

The highest wavelength absorption maximum of the population of all silver nanoplatelets in the composition being within the range of 450 to 550 nm, preferably 460 to 540 nm, most preferably 465 to 535 nm (measured in water at ca. 5*10-5 M (mol/l) concentration of silver).

The absorption maximum has a full width at half maximum (FWHM) value in the range of 20 to 180 nm, preferably 30 to 150 nm, more preferably 35 to 130 nm.

Reference is made to Example 1. Three inks each containing 0.92% by weight silver nanoplatelets the synthesis of which is described in PCT/EP2019/078469 and 0.08% by weight (surface) stabilizing agent(s) and different amounts of nitrocellulose (0, 0.1 and 0.5% by weight, respectively) and 1-methoxy-2-propanol (99, 98.9 and 98.5% by weight, respectively) were prepared, coated onto the shiny side of aluminium foil (24 μm thickness) and PET film (Melinex 506) for comparison and dried with a hot-air drier. Reflection spectra are recorded in the wavelength range of 350-1400 nm. Reflection spectra on PET foil are recorded with aluminium foil background.

Dependent on the binder concentration a remarkable shift of the maximum absorption wavelength of silver nanoplatelets for identical coatings on aluminium foil and PET film is observed.

| | Nitrocellulose concentration, % w/w | Absorption maximum on PET film [nm] | Absorption maximum on aluminium foil [nm] |
|---|---|---|---|
| Ink 1 | 0 | ca. 550 | ca. 940 |
| Ink 2 | 0.1 | ca. 540 | ca. 720 |
| Ink 3 | 0.5 | ca. 500 | ca. 600 |

Accordingly, the maximum absorption wavelength of Ag nanoplatelets can be tuned in the range of 600 to 940 nm by simple variation of binder concentration.

The composition for producing layer d) normally comprises:

(i) silver nanoparticles in an amount of 0.1 to 20% by weight, preferably 0.2 to 10% by weight,
(ii) a solvent in an amount of 50 to 99.8% by weight, preferably 70 to 99.8% by weight,
(iii) (surface) stabilizing agent(s) in an amount of 0.0001 to 5% by weight, preferably 0.005 to 2.5% by weight, and
(iv) optionally a binder in an amount of from 0 to 20% by weight, preferably 0 to 5% by weight, wherein the amounts of components (i), (ii), (iii) and (iv) are based on the total weight of the composition.

The amount of (surface) stabilizing agent(s) relative to the amount of silver nanoparticles in layer d) is from 0.1 to 20% by weight of (surface) stabilizing agent(s) relative to the weight of silver nanoparticles, especially from 0.5 to 15% by weight of (surface) stabilizing agent(s) relative to the weight of silver nanoparticles.

The amount of binder relative to the amount of silver nanoparticles in layer d) is from 0 to 100% by weight binder relative to the weight of silver nanoparticles, especially from 0 to 60% by weight binder relative to the weight of silver nanoparticles.

The solvent is preferably selected from alcohols (such as methanol, ethanol, 1-propanol, 2-propanol, 1-butanol, 2-butanol, isobutanol, tert-butanol, tert-pentanol), cyclic or acyclic ethers (such as diethyl ether, tetrahydrofuran and 2-methyltetrahydrofurane), ketones (such as acetone, 2-butanone, 3-pentanone), ether-alcohols (such as 2-methoxyethanol, 1-methoxy-2-propanol, ethylene glycol monobutyl ether, diethylene glycol monoethyl ether, diethylene glycol monopropyl ether, and diethylene glycol monobutyl ether), esters (such as ethyl acetate, ethyl propionate, and ethyl 3-ethoxypropionate), polar aprotic solvents (such as acetonitrile, dimethyl formamide, and dimethyl sulfoxide), mixtures thereof and mixtures with water. The preferred solvents include $C_2$-$C_6$ alcohols, ethers, ether-alcohols, mixtures thereof and mixtures with water.

The compositions may comprise a binder. The binder can be of organic, inorganic or hybrid nature. The binder is non-volatile. The binder is a dielectric, or semiconducting material.

Inorganic binders have a skeletal structure that does not include carbon atoms in the backbone. Examples are polysiloxanes, where the main chain features Si and O centers, —Si—O—Si—O—. Each Si center has two further substituents, usually methyl or phenyl. Within the scope of the present invention, inorganic binder may also comprise of inorganic nanoparticles, preferably metal oxides, such as $SiO_2$ or $TiO_2$ nanoparticles. Preferably, inorganic nanoparticles have an average diameter of less than 20 nm.

Hybrid materials contain inorganic and organic components.

Preferably, the binder is a high-molecular-weight organic compound conventionally used in coating compositions. High molecular weight organic materials usually have molecular weights of about from 103 to 108 g/mol or even more. They may be, for example, natural resins, drying oils, rubber or casein, or natural substances derived therefrom, such as chlorinated rubber, oil-modified alkyd resins, viscose, cellulose ethers or esters, such as ethylcellulose, cellulose acetate, cellulose propionate, cellulose acetobutyrate or nitrocellulose, but especially totally synthetic organic polymers (thermosetting plastics and thermoplastics), as are obtained by polymerisation, polycondensation or polyaddition. From the class of the polymerisation resins there may be mentioned, especially, polyolefins, such as polyethylene, polypropylene or polyisobutylene, and also substituted polyolefins, such as polymerisation products of vinyl chloride, vinyl acetate, styrene, acrylonitrile, acrylic acid esters, methacrylic acid esters or butadiene, and also copolymerisation products of the said monomers, such as especially ABS or EVA.

With respect to the binder resin, a thermoplastic resin may be used, examples of which include, polyethylene based polymers [polyethylene (PE), ethylene-vinyl acetate copolymer (EVA), vinyl chloride-vinyl acetate copolymer, vinyl alcohol-vinyl acetate copolymer, polypropylene (PP), vinyl based polymers [poly(vinyl chloride) (PVC), poly(vinyl butyral) (PVB), poly(vinyl alcohol) (PVA), poly(vinylidene chloride) (PVdC), poly(vinyl acetate) (PVAc), poly(vinyl formal) (PVF)], polystyrene based polymers [polystyrene (PS), styrene-acrylonitrile copolymer (AS), acrylonitrile-butadiene-styrene copolymer (ABS)], acrylic based polymers [poly(methyl methacrylate) (PMMA), MMA-styrene copolymer], polycarbonate (PC), celluloses [ethyl cellulose (EC), cellulose acetate (CA), propyl cellulose (CP), cellulose acetate butyrate (CAB), cellulose nitrate (CN), also known as nitrocellulose], fluorin based polymers [polychlorofluoroethylene (PCTFE), polytetrafluoroethylene (PTFE), tetrafluoroethylene-hexafluoroethylene copolymer (FEP), poly(vinylidene fluoride) (PVdF)], urethane based polymers (PU), nylons [type 6, type 66, type 610, type 11], polyesters (alkyl) [polyethylene terephthalate (PET), polybutylene terephthalate (PBT), polycyclohexane terephthalate (PCT)], novolac type phenolic resins, or the like. In addition, thermosetting resins such as resol type phenolic resin, a urea resin, a melamine resin, a polyurethane resin, an epoxy resin, an unsaturated polyester and the like, and natural resins such as protein, gum, shellac, copal, starch and rosin may also be used.

The binder preferably comprises nitrocellulose, ethyl cellulose, cellulose acetate, cellulose acetate propionate (CAP), cellulose acetate butyrate (CAB), hydroxyethyl cellulose (HEC), hydroxypropyl cellulose (HPC), alcohol soluble propionate (ASP), vinyl chloride, vinyl acetate copolymers, vinyl acetate, vinyl, acrylic, polyurethane, polyamide, rosin ester, hydrocarbon, aldehyde, ketone, urethane, polythylene-terephthalate, terpene phenol, polyolefin, silicone, cellulose, polyamide, polyester, rosin ester resins, shellac and mixtures thereof, most preferred are soluble cellulose derivatives such as hydroxylethyl cellulose, hydroxypropyl cellulose, nitrocellulose, carboxymethylcellulose as well as chitosan and agarose, in particular hydroxyethyl cellulose and hydroxypropyl cellulose.

Alternatively, the layer (d), comprising the silver nanoparticles may comprise an UV curable binder (UV curable composition). UV curing can be replaced by EB curing, thus eliminating the need for a photoinitiator.

The UV curable composition is preferably deposited by means of gravure, offset flexographic, inkjet, offset or screen printing process.

The UV curable composition comprises (a) 1.0 to 20.0, especially 1.0 to 15.0, very especially 3.0 to 10.0% by weight of photoinitiator, (b) 99.0 to 80.0, especially 99.0 to 85.0, very especially 97.0 to 90.0% by weight of a binder (unsaturated compound(s) including one or more olefinic double bonds), wherein the sum of components a) and b) adds up to 100%.

Examples of photoinitiators are known to the person skilled in the art and for example published by Kurt Dietliker in "A compilation of photoinitiators commercially available for UV today", Sita Technology Textbook, Edinburgh, London, 2002.

The surface stabilizing agent(s) is used on the one hand to avoid agglomeration and/or flocculation of the silver nanoparticles (colloidal stabilization). On the other hand, the surface stabilizing agent(s) (optionally in combination with the binder) provides the required separation of the silver nanoparticles from each other and from the metal layer.

In some cases it may be desirable to use more than one surface stabilizing agent.

The silver nanoparticles may bear a surface stabilizing agent of formula (I)

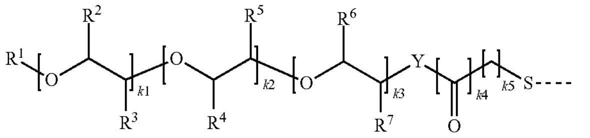

surface, wherein ········· indicates the bond to the silver, $R^1$ is H, $C_1$-$C_{18}$alkyl, phenyl, $C_1$-$C_8$alkylphenyl, or $CH_2COOH$;

$R^2$, $R^3$, $R^4$, $R^5$, $R^6$ and $R^7$ are independently of each other H, $C_1$-$C_8$alkyl, or phenyl;

Y is O, or $NR^8$;

$R^8$ is H, or $C_1$-$C_8$alkyl;

k1 is an integer in the range of from 1 to 500, k2 and k3 are independently of each other 0, or integers in the range of from 1 to 250;

k4 is0, or 1, k5 is an integer in the range of from 1 to 5.

Y is preferably O. k4 is preferably 0.

The surface stabilizing agent of formula (I) has preferably a number average molecular weight of from 1000 to 20000, and more preferably from 1000 to 10000, most preferred from 1000 to 6000. All molecular weights specified in this text have the unit of [g/mol] and refer, unless indicated otherwise, to the number average molecular weight (Mn).

The most preferred surface stabilizing agent has the formula

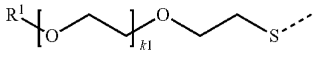

(Ia), wherein $R^1$ is H, or a $C_1$-$C_8$alkyl group, and k1 is 22 to 450, especially 22 to 150.

$R^1$ is preferably H, or $CH_3$.

The most preferred surface stabilizing agents are derived from MPEG thiols (poly(ethylene glycol) methyl ether thiols) having an average $M_n$ of 2000 to 6000, such as, for example, MPEG 2000 thiol (A-1, average $M_n$ 2,000), MPEG 3000 thiol (A-2), MPEG 4000 thiol (A-3) MPEG 5000 thiol (A-4), MPEG 6000 thiol (A-5), PEG thiols (0-(2-mercapto-ethyl)-poly(ethylene glycol)) having an average $M_n$ of 2000 to 6000, such as, for example, PEG 2000 thiol (A-6, average $M_n$ 2,000), PEG 3000 thiol (A-7), PEG 4000 thiol (A-8), PEG 5000 thiol (A-9), PEG 6000 thiol (A-10).

In addition to the surface stabilizing agents the composition may comprise further stabilization agents. Stabilizing agents may include, for example, phosphines; phosphine oxides; alkyl phosphonic acids; oligoamines, such as ethylenediamine, diethylene triamine, triethylene tetramine, spermidine, spermine; compounds of formula (IIa), (IIb) and (IIc) described below; surfactants; dendrimers, and salts and combinations thereof.

Surfactants include, for example, anionic surfactants, cationic surfactants, nonionic surfactants, amphoteric or zwitterionic surfactants.

The stabilizing agent may be a compound of formula $R^{20}$—X (IIa), wherein $R^{20}$ a linear or branched $C_1$-$C_{25}$alkyl group, or $C_1$-$C_{25}$alkenyl group, which may be substituted by one, or more groups selected from —OH, —SH, —$NH_2$, or —$COOR^{19}$, wherein $R^{19}$ is a hydrogen atom, or a $C_1$-$C_{25}$alkyl group, and X is —OH, —SH, —$NH_2$, or —$COOR^{19'}$, wherein $R^{19'}$ is a hydrogen atom, a $C_1$-$C_{25}$alkyl group, or a $C_2$-$C_{25}$alkenyl group, which may be substituted by one, or more groups selected from —OH, —SH, —$NH_2$, or —$COOR^{19''}$, wherein $R^{19''}$ is a hydrogen atom, or a $C_1$-$C_{25}$alkyl group.

Examples of compounds of formula (IIa) are 1-methylamine, 1-dodecylamine, 1-hexadecylamine, citric acid, oleic acid, D-cysteine, 1-dodecanethiol, 9-mercapto-1-nonanol, 1-thioglycerol, 11-amino-1-undecanethiol, cysteamine, 3-mercaptopropanoic acid, 8-mercaptooctanoic acid and 1,2-ethanedithiol.

The stabilizing agent may be a compound of formula (IIb)

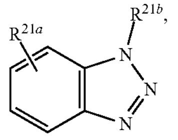

wherein $R^{21a}$ is a hydrogen atom, a halogen atom, a $C_1$-$C_8$alkoxy group, or a $C_1$-$C_8$alkyl group, $R^{21b}$ is a hydrogen atom, or a group of formula —$CHR^{24}$—$N(R^{22})(R^{23})$, $R^{22}$ and $R^{23}$ are independently of each other a $C_1$-$C_8$alkyl, a hydroxy$C_1$-$C_5$alkyl group, or a group of formula —$[(CH_2CH_2)—O]_{n1}$—$CH_2CH_2$—OH, wherein n1 is 1 to 5, $R^{24}$ is H or $C_1$-$C_8$alkyl. Examples of compounds of formula (IIb) are (B-1)

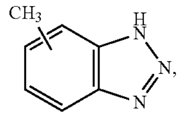

(B-2)

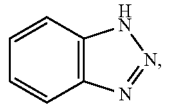

(B-3)

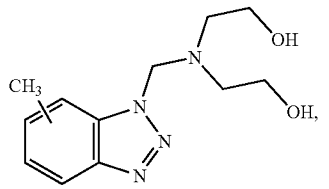

(B-4)

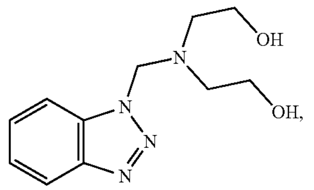

(B-5)

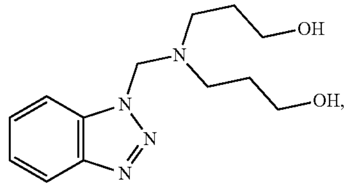

-continued (B-6)

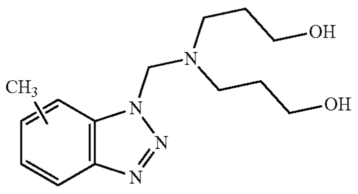

and (B-7)

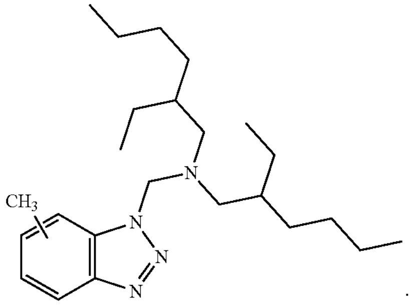

.

In another preferred embodiment the stabilizing agent is a "polyhydric phenol", which is a compound, containing an optionally substituted benzene ring and at least 2 hydroxy groups attached to it. The term "polyhydric phenol" comprises polyphenols, such as, for example, tannic acid and polycyclic aromatic hydrocarbons which consist of fused benzene rings, wherein at least one benzene ring has at least 2 hydroxy groups attached to it, such as, for example, 1,2-dihydroxynaphthalene. The "polyhydric phenol" may be substituted. Suitable substituents are described below.

The polyhydric phenol is preferably a compound of formula (IIc)

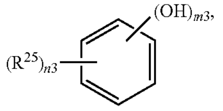

wherein $R^{25}$ can be the same, or different in each occurrence and is a hydrogen atom, a halogen atom, a $C_1$-$C_{18}$alkyl group, a $C_1$-$C_{18}$alkoxy group, or a group —C(═O)—$R^{26}$, $R^{26}$ is a hydrogen atom, a hydroxy group, a $C_1$-$C_{18}$alkyl group, unsubstituted or substituted amino group, unsubstituted or substituted phenyl group, or a $C_1$-$C_{18}$alkoxy group, and n3 is a number of 1 to 4, m3 is a number of 2 to 4, and the sum of m3 and n3 is 6.

The polyhydric phenol is more preferably a compound of formula (IIc')

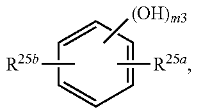

wherein $R^{25a}$ and $R^{25b}$ are independently of each other a hydrogen atom, a $C_1$-$C_{18}$alkyl group, a $C_1$-$C_{18}$alkoxy group, or a group of formula-C(═O)—$R^{26}$, $R^{26}$ is a hydrogen atom, a hydroxy group, a $C_1$-$C_{18}$alkyl group, an unsubstituted or substituted amino group, unsubstituted or substituted phenyl group, or a $C_1$-$C_{18}$alkoxy group, and m3 is a number of 2 to 4, especially 2 to 3. Polyhydric phenols are preferred, which have two hydroxy groups in ortho-position.

Even more preferably, the polyhydric phenol is a compound of formula (IIca)

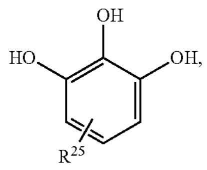

wherein $R^{25}$ is a hydrogen atom, or a group of formula —C(═O)—$R^{26}$, wherein $R^{26}$ is a hydrogen atom, a $C_1$-$C_{18}$alkyl group, or a $C_1$-$C_{18}$alkoxy group, an unsubstituted or substituted amino group, especially a $C_1$-$C_{18}$alkyl group or $C_1$-$C_8$alkoxy group.

Most preferred, the polyhydric phenol is a compound of formula (IIca')

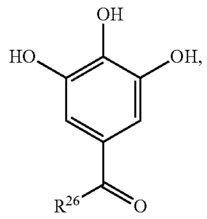

wherein $R^{26}$ is a hydrogen atom, a $C_1$-$C_{18}$alkyl group, or a $C_1$-$C_{18}$alkoxy group, especially a $C_1$-$C_8$alkoxy group, such as, for example,

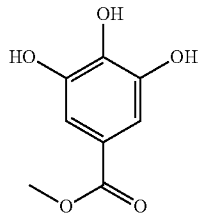

(methyl gallate, C-1),

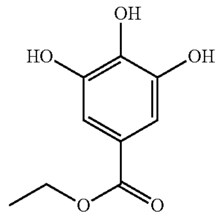

(ethyl gallate, C-2),

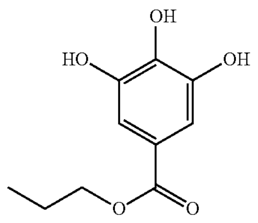

(propyl gallate, C-3),

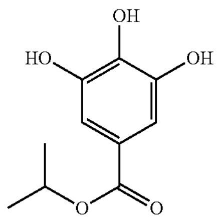

(isopropyl gallate, C-4)

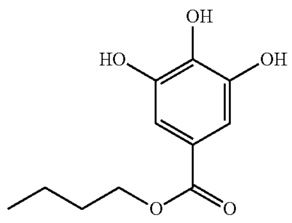 [SMILES: CCCCOC(=O)c1cc(O)c(O)c(O)c1]

(butyl gallate, C-5),

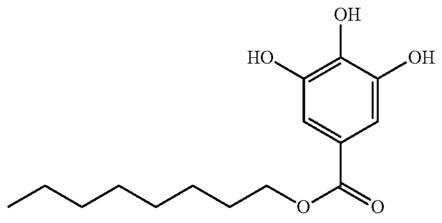 [SMILES: CCCCCCCCOC(=O)c1cc(O)c(O)c(O)c1]

(octyl gallate, C-6) and

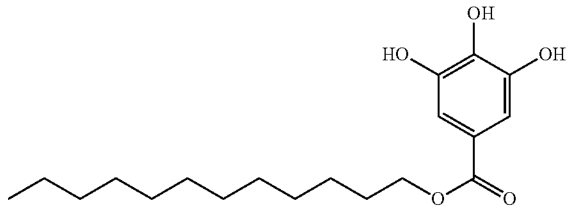 [SMILES: CCCCCCCCCCCCOC(=O)c1cc(O)c(O)c(O)c1]

(lauryl gallate, C-7).

In another preferred embodiment of the present invention the polyhydric phenols are compounds of formula

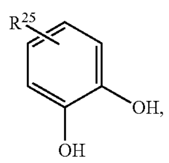

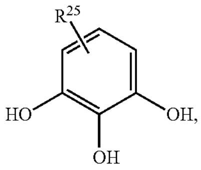

or

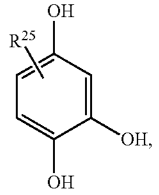

wherein $R^{25}$ is a hydrogen atom, a $C_1$-$C_{18}$alkyl group, or a group of formula-C(=O)—$R^{26}$, wherein $R^{26}$ is a hydrogen atom, a hydroxy group, a $C_1$-$C_{18}$alkyl group, or a $C_1$-$C_{18}$alkoxy group, an unsubstituted or substituted amino group, an unsubstituted or substituted phenyl group, especially a $C_1$-$C_{18}$alkyl group or $C_1$-$C_8$alkoxy group, such as, for example, (C-8)

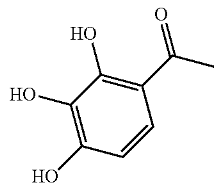

and (C-9)

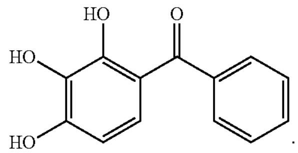

An unsubstituted or substituted amino group is, for example, a group of formula —$NR^{27}R^{28}$, wherein $R^{27}$ and $R^{28}$ are independently of each other a hydrogen atom, a $C_1$-$C_{18}$alkyl group, a phenyl group, preferably a hydrogen atom, or a $C_1$-$C_{18}$alkyl group.

In a particularly preferred embodiment the (surface) stabilizing agent(s) is selected from compounds of formula (Ia), especially cpds. (A-1), (A-2), (A-3), (A-4), (A-5), (A-6), (A-7), (A-8), (A-9) and (A-10), compounds of formula (IIb), especially cpds. (B-1), (B-2), (B-3), (B-4), (B-5), (B-6) and (B-7), compounds of formula (IIc), especially cpds. (C-1), (C-2), (C-3), (C-4), (C-5), (C-6), (C-7), (C-8) and (C-9) and mixtures thereof.

The silver nanoparticles are typically in the form platelets, cubes, spheres, trigonal and hexagonal nanoprisms etc. The silver nanoparticles have an average diameter of from 5 to 500 nm, especially 20 to 500 nm.

In case of irregularly formed silver nanoparticles the diameter is the maximum dimension of the silver nanoparticles.

Preferably, the silver nanoparticles are in the form of platelets having a maximum dimension (length) of from 20 to 500 nm and a thickness of from 2 to 40 nm.

In a preferred embodiment of the present invention the silver nanoparticles are in the form of platelets and have an average thickness of 5 to 30 nm and an average diameter of 20 to 70 nm. By varying the amount of (surface) stabilizing agent(s) and optionally binder relative to the amount of silver nanoparticles in layer (d) the maximum absorption wavelength of the silver nanoparticles is controlled in the range of 900 to 1000 nm.

In another preferred embodiment of the present invention the silver nanoparticles are in the form of platelets and have an average thickness of 8 to 20 nm and an average diameter of 50 to 120 nm. By varying the amount of (surface) stabilizing agent(s) and optionally binder relative to the amount of silver nanoparticles in layer (d) the maximum absorption wavelength of the silver nanoparticles is controlled in the range of 800 to 1600 nm.

Preferably, layer (d) is colorless, or nearly colorless in the visible range of the electromagnetic spectrum.

The protective layer (e) is applied on top of layer (d). The protective layer is preferably transparent or translucent. Examples for coatings are known to the skilled person. For example, water borne coatings, UV-cured coatings or laminated coatings may be used.

UV-cured coatings are preferably derived from UV curable compositions which are preferably deposited by means of gravure, offset flexographic, ink jet, offset and screen printing process.

The UV curable composition comprises photoinitiator(s) and unsaturated compound(s) including one or more olefinic double bonds (binder).

Examples of photoinitiators are known to the person skilled in the art and for example published by Kurt Dietliker in "A compilation of photoinitiators commercially available for UV today", Sita Technology Textbook, Edinburgh, London, 2002.

Examples of photoinitiators are known to the person skilled in the art and for example published by Kurt Dietliker in "A compilation of photoinitiators commercially available for UV today", Sita Technology Textbook, Edinburgh, London, 2002.

Examples of suitable acylphosphine oxide compounds are of the formula XII (XII)

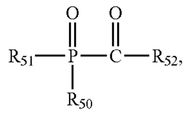

wherein $R_{50}$ is unsubstituted cyclohexyl, cyclopentyl, phenyl, naphthyl or biphenylyl; or is cyclohexyl, cyclopentyl, phenyl, naphthyl or biphenylyl substituted by one or more halogen, $C_1$-$C_{12}$alkyl, $C_1$-$C_{12}$alkoxy, $C_1$-$C_{12}$alkylthio or by $NR_{53}R_{54}$; or $R_{50}$ is unsubstituted $C_1$-$C_{20}$alkyl or is $C_1$-$C_{20}$alkyl which is substituted by one or more halogen, $C_1$-$C_{12}$alkoxy, $C_1$-$C_{12}$alkylthio, $NR_{53}R_{54}$ or by —(CO)—O—$C_1$-$C_{24}$alkyl;

$R_{51}$ is unsubstituted cyclohexyl, cyclopentyl, phenyl, naphthyl or biphenylyl; or is cyclohexyl, cyclopentyl, phenyl, naphthyl or biphenylyl substituted by one or more halogen, $C_1$-$C_{12}$alkyl, $C_1$-$C_{12}$alkoxy, $C_1$-$C_{12}$alkylthio or by $NR_{53}R_{54}$; or $R_{51}$ is —(CO)R'$_{52}$; or $R_{51}$ is $C_1$-$C_{12}$alkyl which is unsubstituted or substituted by one or more halogen, $C_1$-$C_{12}$alkoxy, $C_1$-$C_{12}$alkylthio, or by $NR_{53}R_{54}$;

$R_{52}$ and $R'_{52}$ independently of each other are unsubstituted cyclohexyl, cyclopentyl, phenyl, naphthyl or biphenylyl, or are cyclohexyl, cyclopentyl, phenyl, naphthyl or biphenylyl substituted by one or more halogen, $C_1$-$C_4$alkyl or $C_1$-$C_4$alkoxy; or $R_{52}$ is a 5- or 6-membered heterocyclic ring comprising an S atom or N atom;

$R_{53}$ and $R_{54}$ independently of one another are hydrogen, unsubstituted $C_1$-$C_{12}$alkyl or $C_1$-$C_{12}$alkyl substituted by one or more OH or SH wherein the alkyl chain optionally is interrupted by one to four oxygen atoms; or $R_{53}$ and $R_{54}$ independently of one another are $C_2$-$C_{12}$-alkenyl, cyclopentyl, cyclohexyl, benzyl or phenyl;

Specific examples are bis(2,4,6-trimethylbenzoyl)-phenylphosphine oxide; 2,4,6-trimethylbenzoyl-diphenyl-phosphine oxide; ethyl (2,4,6 trimethylbenzoyl phenyl) phosphinic acid ester; (2,4,6-trimethylbenzoyl)-2,4-dipentoxyphenylphosphine oxide, bis(2,6-dimethoxybenzoyl)-2,4,4-trimethylpentylphosphine oxide.

Interesting further are mixtures of the compounds of the formula XII with compounds of the formula XI as well as mixtures of different compounds of the formula XII.

Examples are mixtures of bis(2,6-dimethoxybenzoyl)-2,4,4-trimethylpentylphosphine oxide with 1-hydroxy-cyclohexyl-phenyl-ketone, of bis(2,4,6-trimethylbenzoyl)-phenylphosphine oxide with 2-hydroxy-2-methyl-1-phenyl-propan-1-one, of bis(2,4,6-trimethylbenzoyl)-phenylphosphine oxide with ethyl (2,4,6 trimethylbenzoyl phenyl) phosphinic acid ester, etc. Examples of suitable benzophenone compounds are compounds of the formula X:

(X)

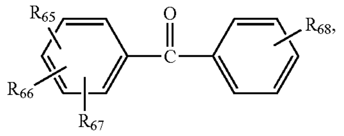

$R_{65}$, $R_{66}$ and $R_{67}$ independently of one another are hydrogen, $C_1$-$C_4$alkyl, $C_1$-$C_4$-halogenalkyl, $C_1$-$C_4$alkoxy, Cl or N($C_1$-$C_4$alkyl)$_2$;

$R_{68}$ is hydrogen, $C_1$-$C_4$alkyl, $C_1$-$C_4$halogenalkyl, phenyl, N($C_1$-$C_4$alkyl)$_2$, $COOCH_3$,

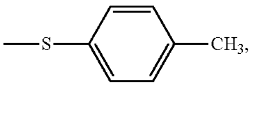

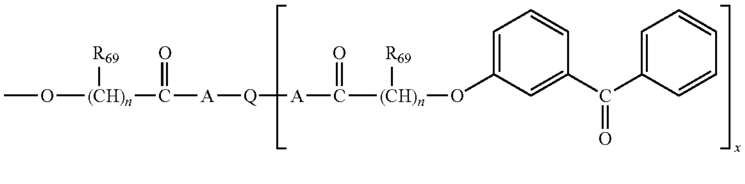 or

-continued

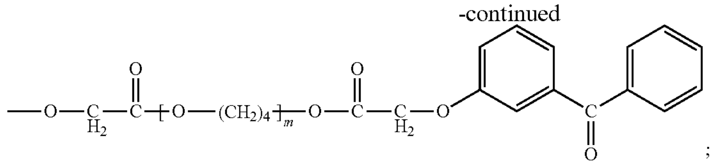

;

Q is a residue of a polyhydroxy compound having 2 to 6 hydroxy groups;

x is a number greater than 1 but no greater than the number of available hydroxyl groups in Q;

A is $-[O(CH_2)_bCO]_y-$ or $-[O(CH_2)_bCO]_{(y-1)}-[O(CHR_{71}CHR_{70})_a]_y-$;

$R_{69}$ is hydrogen, methyl or ethyl; and if N is greater than 1 the radicals $R_{69}$ may be the same as or different from each other;

a is a number from 1 to 2;

b is a number from 4 to 5;

y is a number from 1 to 10;

n is; and m is an integer 2-10.

Specific examples are benzophenone, a mixture of 2,4,6-trimethylbenzophenone and 4-methylbenzophenone, 4-phenylbenzophenone, 4-methoxybenzophenone, 4,4'-dimethoxybenzophenone, 4,4'-dimethylbenzophenone, 4,4'-dichlorobenzophenone, 4,4'-dimethylaminobenzophenone, 4,4'-diethylaminobenzophenone, 4-methylbenzophenone, 2,4,6-trimethylbenzophenone, 4-(4-methylthiophenyl)benzophenone, 3,3'-dimethyl-4-methoxybenzophenone, methyl-2-benzoylbenzoate, 4-(2-hydroxyethylthio)benzophenone, 4-(4-tolylthio)benzophenone, 4-benzoyl-N,N,N-trimethylbenzenemethanaminium chloride, 2-hydroxy-3-(4-benzoylphenoxy)-N,N,N-trimethyl-1-propanaminium chloride monohydrate, 4-(13-acryloyl-1,4,7,10,13-pentaoxatridecyl)benzophenone, 4-benzoyl-N,N-dimethyl-N-[2-(1-oxo-2-propenyl)oxy]ethylbenzenemethanaminium chloride; [4-(2-hydroxy-ethylsulfanyl)-phenyl]-(4-isopropylphenyl)-methanone; biphenyl-[4-(2-hydroxy-ethylsulfanyl)-phenyl]-methanone; biphenyl-4-yl-phenyl-methanone; biphenyl-4-yl-p-tolyl-methanone; biphenyl-4-yl-m-tolyl-methanone; [4-(2-hydroxy-ethylsulfanyl)-phenyl]-p-tolyl-methanone; [4-(2-hydroxy-ethylsulfanyl)-phenyl]-(4-isopropyl-phenyl)-methanone; [4-(2-hydroxy-ethylsulfanyl)-phenyl]-(4-methoxy-phenyl)-methanone; 1-(4-benzoyl-phenoxy)-propan-2-one; [4-(2-hydroxy-ethylsulfanyl)-phenyl]-(4-phenoxy-phenyl)-methanone; 3-(4-benzoyl-phenyl)-2-dimethylamino-2-methyl-1-phenyl-propan-1-one; (4-chloro-phenyl)-(4-octylsulfanyl-phenyl)-methanone; (4-chloro-phenyl)-(4-dodecylsulfanyl-phenyl)-methanone; (4-bromo-phenyl)-(4-octylsulfanyl-phenyl)-methanone; (4-dodecylsulfanyl-phenyl)-(4-methoxy-phenyl)-methanone; (4-benzoyl-phenoxy)-acetic acid methyl ester; biphenyl-[4-(2-hydroxy-ethylsulfanyl)-phenyl]-methanone; 1-[4-(4-benzoylphenylsulfanyl)phenyl]-2-methyl-2-(4-methylphenylsulfonyl)propan-1-one.

Examples of suitable alpha-hydroxy ketone, alpha-alkoxyketone or alpha-aminoketone compounds are of the formula (XI)

(XI)

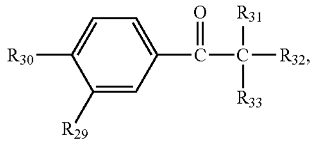

wherein $R_{29}$ is hydrogen or $C_1$-$C_{18}$alkoxy;

$R_{30}$ is hydrogen, $C_1$-$C_{18}$alkyl, $C_1$-$C_{12}$ hydroxyalkyl, $C_1$-$C_{18}$alkoxy, $OCH_2CH_2-OR_{34}$, morpholino, S—$C_1$-$C_{18}$alkyl, a group $-HC{=}CH_2$, $-C(CH_3){=}CH_2$, $-C(CH_2-CH_2$

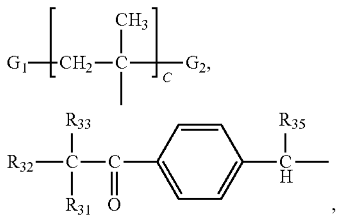

,

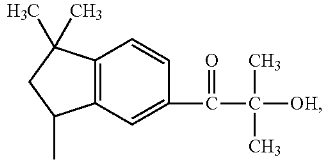

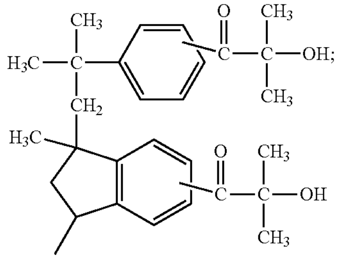

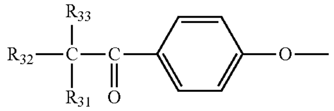

or

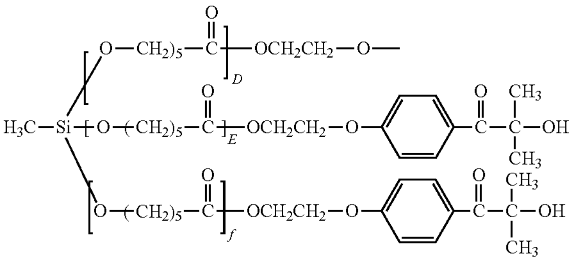

d, e and f are 1-3;

c is 2-10;

$G_1$ and $G_2$ independently of one another are end groups of the polymeric structure, preferably hydrogen or methyl;

$R_{34}$ is hydrogen

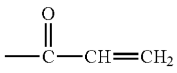
or
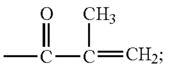

$R_{31}$ is hydroxy, $C_1$-$C_{16}$alkoxy, morpholino, dimethylamino or —$O(CH_2CH_2O)_g$—$C_1$-$C_{16}$alkyl;

g is 1-20;

$R_{32}$ and $R_{33}$ independently of one another are hydrogen, $C_1$-$C_6$alkyl, $C_1$-$C_{16}$alkoxy or —$O(CH_2CH_2O)_g$—$C_1$-$C_{16}$alkyl; or are unsubstituted phenyl or benzyl; or phenyl or benzyl substituted by $C_1$-$C_{12}$-alkyl; or $R_{32}$ and $R_{33}$ together with the carbon atom to which they are attached form a cyclohexyl ring;

$R_{35}$ is hydrogen, $OR_{36}$ or $NR_{37}R_{38}$;

$R_{36}$ is hydrogen, $C_1$-$C_{12}$alkyl which optionally is interrupted by one or more non-consecutive O-atoms and which uninterrupted or interrupted $C_1$-$C_{12}$alkyl optionally is substituted by one or more OH, or $R_{36}$ is

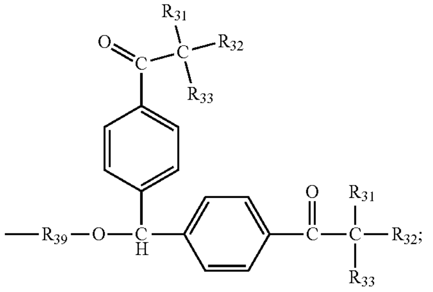

$R^{37}$ and $R_{38}$ independently of each other are hydrogen or $C_1$-$C_{12}$alkyl which is unsubstituted or is substituted by one or more OH;

$R_{39}$ is $C_1$-$C_{12}$alkylene which optionally is interrupted by one or more non-consecutive O, —(CO)—NH—$C_1$-$C_{12}$alkylene-NH—(CO)— or

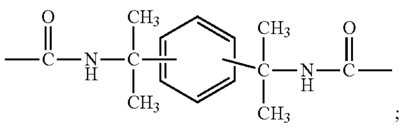

with the proviso that $R_{31}$, $R_{32}$ and $R_{33}$ not all together are $C_1$-$C_{16}$alkoxy or —$O(CH_2CH_2O)_g$—$C_1$-$C_{16}$alkyl.

Specific examples are 1-hydroxy-cyclohexyl-phenyl-ketone (optionally in admixture with benzophenone), 2-methyl-1[4-(methylthio)phenyl]-2-morpholinopropan-1-one, 2-benzyl-2-dimethylamino-1-(4-morpholinophenyl)-butan-1-one, 2-dimethylamino-2-(4-methyl-benzyl)-1-(4-morpholin-4-yl-phenyl)-butan-1-one, (3,4-dimethoxy-benzoyl)-1-benzyl-1-dimethylamino propane, 1-[4-(2-hydroxyethoxy)-phenyl]-2-hydroxy-2-methyl-1-propan-1-one, 2,2-dimethoxy-1,2-diphenylethan-1-one, 2-hydroxy-2-methyl-1-phenyl-propan-1-one, 2-hydroxy-1-{4-[4-(2-hydroxy-2-methyl-propionyl)-benzyl]-phenyl}-2-methyl-propan-1-one, 2-hydroxy-1-{4-[4-(2-hydroxy-2-methyl-propionyl)-phenoxy]-phenyl}-2-methyl-propan-1-one, 2-hydroxy-1-{1-[4-(2-hydroxy-2-methyl-propionyl)-phenyl]-1,3,3-trimethyl-indan-5-yl}-2-methyl-propan-1-one.

Examples of suitable phenylglyoxylate compounds are of the formula XIII (XIII)

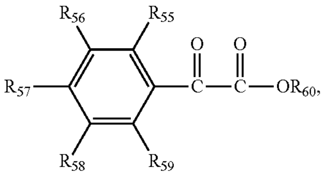

wherein $R_{60}$ is hydrogen, $C_1$-$C_{12}$alkyl or

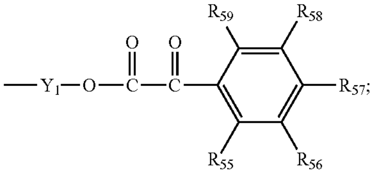

$R_{55}$, $R_{56}$, $R_{57}$, $R_{58}$ and $R_{59}$ independently of one another are hydrogen, unsubstituted $C_1$-$C_{12}$alkyl or $C_1$-$C_{12}$alkyl substituted by one or more OH, $C_1$-$C_4$alkoxy, phenyl, naphthyl, halogen or by CN; wherein the alkyl chain optionally is interrupted by one or more oxygen atoms; or $R_{55}$, $R_{56}$, $R_{57}$, $R_{58}$ and $R_{59}$ independently of one another are $C_1$-$C_4$alkoxy, $C_1$-$C_4$alkylthio or $NR_{52}R^{53}$;

$R_{52}$ and $R_{53}$ independently of one another are hydrogen, unsubstituted $C_1$-$C_{12}$alkyl or $C_1$-$C_{12}$alkyl substituted by one or more OH or SH wherein the alkyl chain optionally is interrupted by one to four oxygen atoms; or $R_{52}$ and $R_{53}$ independently of one another are $C_2$-$C_{12}$-alkenyl, cyclopentyl, cyclohexyl, benzyl or phenyl; and $Y_1$ is $C_1$-$C_{12}$alkylene optionally interrupted by one or more oxygen atoms.

Specific examples of the compounds of the formula XIII are oxo-phenyl-acetic acid 2-[2-(2-oxo-2-phenyl-acetoxy)-ethoxy]-ethyl ester, methyl α-oxo benzeneacetate. Examples of suitable oxime ester compounds are of the formula XIV (XIV)

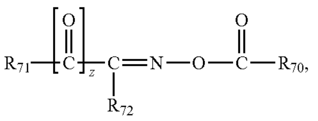

wherein z is 0 or 1;

$R_{70}$ is hydrogen, $C_3$-$C_8$cycloalkyl; $C_1$-$C_{12}$alkyl which is unsubstituted or substituted by one or more halogen, phenyl or by CN; or $R_{70}$ is $C_2$-$C_5$alkenyl; phenyl which is unsubstituted or substituted by one or more $C_1$-$C_6$alkyl, halogen, CN, $OR_{73}$, $SR_{74}$ or by $NR_{75}R_{76}$; or $R_{70}$ is $C_1$-$C_8$alkoxy, benzyloxy; or phenoxy which is unsubstituted or substituted by one or more $C_1$-$C_6$alkyl or by halogen;

$R_{71}$ is phenyl, naphthyl, benzoyl or naphthoyl, each of which is substituted by one or more halogen, $C_1$-$C_{12}$alkyl, $C_3$-$C_8$cycloalkyl, benzyl, phenoxycarbonyl, $C_2$-$C_{12}$alkoxycarbonyl, $OR_{73}$, $SR_{74}$, $SOR_{74}$, $SO_2R_{74}$ or by $NR_{75}R_{76}$, wherein the substituents $OR_{73}$, $SR_{74}$ and $NR_{75}R_{76}$ optionally form 5- or 6-membered rings via the radicals $R_{73}$, $R_{74}$, $R_{75}$ and/or $R_{76}$ with further substituents on the phenyl or naphthyl ring; or each of which is substituted by phenyl or by phenyl which is substituted by one or more $OR_{73}$, $SR_{74}$ or by $NR_{75}R_{66}$;

or $R_{71}$ is thioxanthyl, or

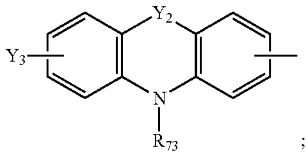

;

$R_{72}$ is hydrogen; unsubstituted $C_1$-$C_{20}$alkyl or $C_1$-$C_{20}$alkyl which is substituted by one or more halogen, $OR_{73}$, $SR_{74}$, $C_3$-$C_8$cycloalkyl or by phenyl; or is $C_3$-$C_8$cycloalkyl; or is phenyl which is unsubstituted or substituted by one or more $C_1$-$C_6$alkyl, phenyl, halogen, $OR_{73}$, $SR_{74}$ or by $NR_{75}R_{76}$; or is $C_2$-$C_{20}$alkanoyl or benzoyl which is unsubstituted or substituted by one or more $C_1$-$C_6$alkyl, phenyl, $OR_{73}$, $SR_{74}$ or by $NR_{75}R_{76}$; or is $C_2$-$C_{12}$alkoxycarbonyl, phenoxycarbonyl, CN, $CONR_{75}R_{76}$, $NO_2$, $C_1$-$C_4$haloalkyl, $S(O)_y$—$C_1$-$C_6$alkyl, or $S(O)_y$-phenyl, y is 1 or 2;

$Y_2$ is a direct bond or no bond;

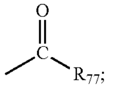

$R_{73}$ and $R_{74}$ independently of one another are hydrogen, $C_1$-$C_{20}$alkyl, $C_2$-$C_{12}$alkenyl, $C_3$-$C_8$cycloalkyl, $C_3$-$C_8$cycloalkyl which is interrupted by one or more, preferably 2, O, phenyl-$C_1$-$C_3$alkyl; or are $C_1$-$C_8$alkyl which is substituted by OH, SH, CN, $C_1$-$C_8$alkoxy, $C_1$-$C_8$alkanoyl, $C_3$-$C_8$cycloalkyl, by $C_3$-$C_8$cycloalkyl which is interrupted by one or more O, or which $C_1$-$C_8$alkyl is substituted by benzoyl which is unsubstituted or substituted by one or more $C_1$-$C_6$alkyl, halogen, OH, $C_1$-$C_4$alkoxy or by $C_1$-$C_4$alkylsulfanyl; or are phenyl or naphthyl, each of which is unsubstituted or substituted by halogen, $C_1$-$C_{12}$alkyl, $C_1$-$C_{12}$alkoxy, phenyl-$C_1$-$C_3$alkyloxy, phenoxy, $C_1$-$C_{12}$alkylsulfanyl, phenylsulfanyl, $N(C_1$-$C_{12}alkyl)_2$, diphenylamino or by

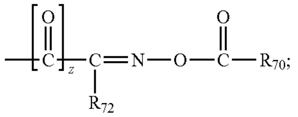

$R_{75}$ and $R_{76}$ independently of each other are hydrogen, $C_1$-$C_{20}$alkyl, $C_2$-$C_4$hydroxyalkyl, $C_2$-$C_{10}$alkoxyalkyl, $C_2$-$C_5$alkenyl, $C_3$-$C_8$cycloalkyl, phenyl-$C_1$-$C_3$alkyl, $C_1$-$C_8$alkanoyl, $C_3$-$C_{12}$alkenoyl, benzoyl; or are phenyl or naphthyl, each of which is unsubstituted or substituted by $C_1$-$C_{12}$alkyl, benzoyl or by $C_1$-$C_{12}$alkoxy; or $R_{75}$ and $R_{76}$ together are $C_2$-$C_6$alkylene optionally interrupted by O or $NR_{73}$ and optionally are substituted by hydroxyl, $C_1$-$C_4$alkoxy, $C_2$-$C_4$alkanoyloxy or by benzoyloxy;

$R_{77}$ is $C_1$-$C_{12}$alkyl, thienyl or phenyl which is unsubstituted or substituted by $C_1$-$C_{12}$alkyl, $OR_{73}$, morpholino or by N-carbazolyl.

Specific examples are 1,2-octanedione 1-[4-(phenylthio)phenyl]-2-(O-benzoyloxime), ethanone 1-[9-ethyl-6-(2-methylbenzoyl)-9H-carbazol-3-yl]-1-(0-acetyloxime), 9H-thioxanthene-2-carboxaldehyde 9-oxo-2-(O-acetyloxime), ethanone 1-[9-ethyl-6-(4morpholinobenzoyl)-9H-carbazol-3-yl]-1-(0-acetyloxime), ethanone 1-[9-ethyl-6-(2-methyl-4-(2-(1,3-dioxo-2-dimethyl-cyclopent-5-yl)ethoxy)-benzoyl)-9H-carbazol-3-yl]-1-(O-acetyloxime) (Adeka N-1919), ethanone 1-[9-ethyl-6-nitro-9H-carbazol-3-yl]-1-[2-methyl-4-(1-methyl-2-methoxy)ethoxy)phenyl]-1-(0-acetyloxime) (Adeka NC1831), etc.

It is also possible to add cationic photoinitiators, such as benzoyl peroxide (other suitable peroxides are described in U.S. Pat. No. 4,950,581, column 19, lines 17-25), or aromatic sulfonium, phosphonium or iodonium salts, such as are described, for example, in U.S. Pat. No. 4,950,581, column 18, line 60 to column 19, line 10.

Suitable sulfonium salt compounds are of formula XVa, XVb, XVc, XVd or XVe

XVa

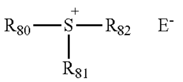

XVb

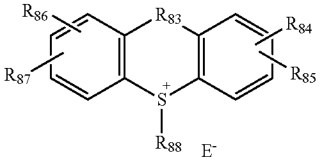

XVc

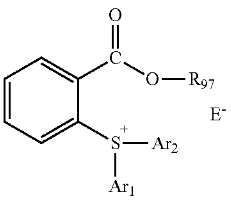

XVd

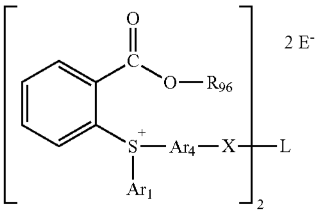

-continued

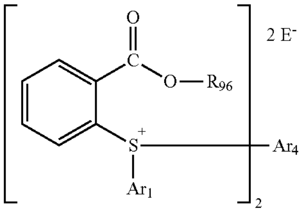

XVe wherein $R_{80}$, $R_{81}$ and $R_{82}$ are each independently of the others unsubstituted phenyl, or phenyl substituted by —S-phenyl,

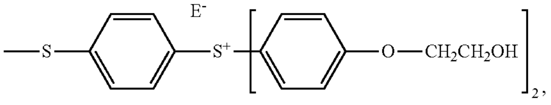

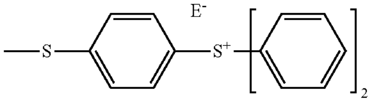

or by

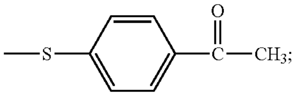

$R_{83}$ is a direct bond, S, O, $CH_2$, $(CH_2)_2$, CO or $NR_{89}$;

$R_{84}$, $R_{85}$, $R_{86}$ and $R_{87}$ independently of one another are hydrogen, $C_1$-$C_{20}$alkyl, $C_3$-$C_8$cycloalkyl, $C_1$-$C_{20}$alkoxy, $C_2$-$C_{20}$alkenyl, CN, OH, halogen, $C_1$-$C_6$alkylthio, phenyl, naphthyl, phenyl-$C_1$-$C_7$alkyl, naphtyl-$C_1$-$C_3$alkyl, phenoxy, naphthyloxy, phenyl-$C_1$-$C_7$alkyloxy, naphtyl-$C_1$-$C_3$alkyloxy, phenyl-$C_2$-$C_6$alkenyl, naphthyl-$C_2$-$C_4$alkenyl, S-phenyl, $(CO)R_{89}$, $O(CO)R_{89}$, $(CO)OR_{89}$, $SO_2R_{89}$ or $OSO_2R_{89}$; $R_{88}$ is $C_1$-$C_{20}$alkyl, $C_1$-$C_{20}$hydroxyalkyl,

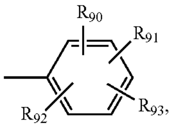

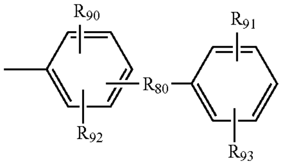

or

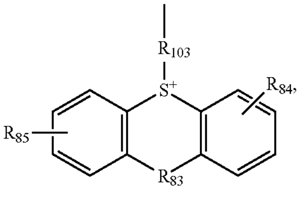

$R_{89}$ is hydrogen, $C_1$-$C_{12}$alkyl, $C_1$-$C_{12}$hydroxyalkyl, phenyl, naphthyl or biphenylyl;

$R_{90}$, $R_{91}$, $R_{92}$ and $R_{93}$ independently of one another have one of the meanings as given for $R_{84}$; or $R_{90}$ and $R_{91}$ are joined to form a fused ring system with the benzene rings to which they are attached;

$R_{95}$ is a direct bond, S, O or $CH_2$;

$R_{96}$ is hydrogen, $C_1$-$C_{20}$alkyl; $C_2$-$C_{20}$alkyl interrupted by one or more O; or is -L-M-$R_{98}$ or -L-$R_{68}$;

$R_{97}$ has one of the meanings as given for $R_{96}$ or is

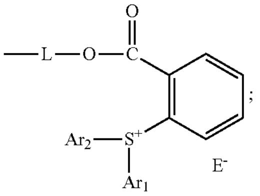

$R_{98}$ is a monovalent sensitizer or photoinitiator moiety;

$Ar_1$ and $Ar_2$ independently of one another are phenyl unsubstituted or substituted by $C_1$-$C_{20}$alkyl, halogen or $OR_{99}$;

or are unsubstituted naphthyl, anthryl, phenanthryl or biphenylyl;

or are naphthyl, anthryl, phenanthryl or biphenylyl substituted by $C_1$-$C_{20}$alkyl, OH or $OR_{99}$; or are —$Ar_4$-$A_1$-$Ar_3$ or

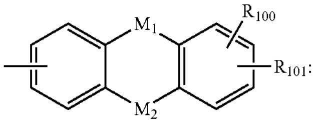

$Ar_3$ is unsubstituted phenyl, naphthyl, anthryl, phenanthryl or biphenylyl;

or is phenyl, naphthyl, anthryl, phenanthryl or biphenylyl substituted by $C_1$-$C_{20}$alkyl, $OR_{99}$ or benzoyl;

$Ar_4$ is phenylene, naphthylene, anthrylene or phenanthrylene;

$A_1$ is a direct bond, S, O or $C_1$-$C_{20}$alkylene;

X is CO, C(O)O, OC(O), O, S or $NR_{99}$;

L is a direct bond, S, O, $C_1$-$C_{20}$alkylene or $C_2$-$C_{20}$alkylene interrupted by one or more non-consecutive O;

$R_{99}$ is $C_1$-$C_{20}$alkyl or $C_1$-$C_{20}$hydroxyalkyl; or is $C_1$-$C_{20}$alkyl substituted by $O(CO)R_{102}$;

$M_1$ is S, CO or $NR_{100}$;

$M_2$ is a direct bond, $CH_2$, O or S;

$R_{100}$ and $R_{101}$ independently of one another are hydrogen, halogen, $C_1$-$C_8$alkyl, $C_1$-$C_8$alkoxy or phenyl;

$R_{102}$ is $C_1$-$C_{20}$alkyl;

$R_{103}$ is

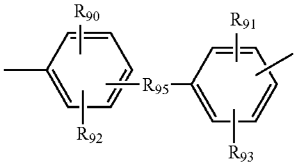

or

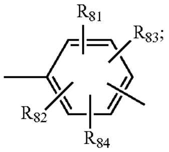

and

E is an anion, especially $PF_6$, $SbF_6$, $AsF_6$, $BF_4$, $(C_6F_5)_4B$, Cl, Br, $HSO_4$, $CF_3$—$SO_3$, F—$SO_3$,

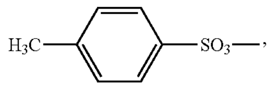

$CH_3—SO_3$, $ClO_3PO_4$, $NO_3$, $SO_4$, $CH_3—SO_4$, or

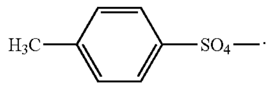

Specific examples of sulfonium salt compounds are for example Irgacure®270 (BASF SE); Cyracure® UVI-6990, Cyracure®UVI-6974 (DOW), Degacure®KI 85 (Degussa), SP-55, SP-150, SP-170 (Asahi Denka), GE UVE 1014 (General Electric), SarCat® KI-85 (=triarylsulfonium hexafluorophosphate; Sartomer), SarCat® CD 1010 (=mixed triarylsulfonium hexafluoroantimonate; Sartomer); SarCat® CD 1011(=mixed triarylsulfonium hexafluorophosphate; Sartomer).

Suitable iodonium salt compounds are of formula XVI

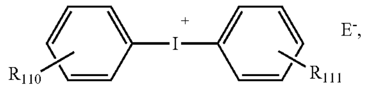

(XVI)

wherein $R_{110}$ and $R_{11}$ are each independently of the other hydrogen, $C_1$-$C_{20}$alkyl, $C_1$-$C_{20}$alkoxy, OH-substituted $C_1$-$C_{20}$alkoxy, halogen, $C_2$-$C_{12}$alkenyl, $C_3$-$C_8$cycloalkyl, especially methyl, isopropyl or isobutyl; and E is an anion, especially $PF_6$, $SbF_6$, $AsF_6$, $BF_4$, $(C_6F_5)_4B$, Cl, Br, $HSO_4$, $CF_3—SO_3$, $F—SO_3$,

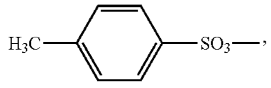

$CH_3—SO_3$, $ClO_4$, $PO_4$, $NO_3$, $SO_4$, $CH_3—SO_4$ or

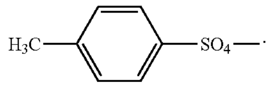

Specific examples of iodonium salt compounds are e.g. tolylcumyliodonium tetrakis(pentafluorophenyl)borate, 4-[(2-hydroxy-tetradecyloxy)phenyl]phenyliodonium hexafluoroantimonate or hexafluorophosphate, tolylcumyliodonium hexafluorophosphate, 4-isopropylphenyl-4'-methylphenyliodonium hexafluorophosphate, 4-isobutylphenyl-4'-methylphenyliodonium hexafluorophosphate, 4-octyloxyphenyl-phenyliodonium hexafluorophosphate or hexafluoroantimonate, bis(dodecylphenyl)iodonium hexafluoroantimonate or hexafluorophosphate, bis(4-methylphenyl)iodonium hexafluorophosphate, bis(4-methoxyphenyl)iodonium hexafluorophosphate, 4-methylphenyl-4'-ethoxyphenyliodonium hexafluorophosphate, 4-methylphenyl-4'-dodecylphenyliodonium hexafluorophosphate, 4-methylphenyl-4'-phenoxyphenyliodonium hexafluorophosphate.

Of all the iodonium salts mentioned, compounds with other anions are, of course, also suitable. The preparation of iodonium salts is known to the person skilled in the art and described in the literature, for example U.S. Pat. Nos. 4,151,175, 3,862,333, 4,694,029, EP 562897, U.S. Pat. Nos. 4,399,071, 6,306,555, WO 98/46647 J. V. Crivello, "Photoinitiated Cationic Polymerization" in: UV Curing: Science and Technology, Editor S. P. Pappas, pages 24-77, Technology Marketing Corporation, Norwalk, Conn. 1980, ISBN No. 0-686-23773-0; J. V. Crivello, J. H. W. Lam, Macromolecules, 10, 1307 (1977) and J. V. Crivello, Ann. Rev. Mater. Sci. 1983, 13, pages 173-190 and J. V. Crivello, Journal of Polymer Science, Part A: Polymer Chemistry, Vol. 37, 4241-4254 (1999).

In certain cases it may be of advantage to use mixtures of two or more photoinitiators.

Halogen is fluorine, chlorine, bromine and iodine.

$C_1$-$C_{24}$alkyl ($C_1$-$C_{20}$alkyl, especially $C_1$-$C_{12}$alkyl) is typically linear or branched, where possible. Examples are methyl, ethyl, n-propyl, isopropyl, n-butyl, sec.-butyl, isobutyl, tert.-butyl, n-pentyl, 2-pentyl, 3-pentyl, 2,2-dimethylpropyl, 1,1,3,3-tetramethylpentyl, n-hexyl, 1-methylhexyl, 1,1,3,3,5,5-hexamethylhexyl, n-heptyl, isoheptyl, 1,1,3,3-tetramethylbutyl, 1-methylheptyl, 3-methylheptyl, n-octyl, 1,1,3,3-tetramethylbutyl and 2-ethylhexyl, n-nonyl, decyl, undecyl, dodecyl, tridecyl, tetradecyl, pentadecyl, hexadecyl, heptadecyl, or octadecyl. $C_1$-$C_8$alkyl is typically methyl, ethyl, n-propyl, isopropyl, n-butyl, sec.-butyl, isobutyl, tert.-butyl, n-pentyl, 2-pentyl, 3-pentyl, 2,2-dimethyl-propyl, n-hexyl, n-heptyl, n-octyl, 1,1,3,3-tetramethylbutyl and 2-ethylhexyl. $C_1$-$C_4$alkyl is typically methyl, ethyl, n-propyl, isopropyl, n-butyl, sec.-butyl, isobutyl, tert.-butyl.

$C_2$-$C_{12}$alkenyl ($C_2$-$C_5$alkenyl) groups are straight-chain or branched alkenyl groups, such as e.g. vinyl, allyl, methallyl, isopropenyl, 2-butenyl, 3-butenyl, isobutenyl, n-penta-2,4-dienyl, 3-methyl-but-2-enyl, n-oct-2-enyl, or n-dodec-2-enyl.

$C_1$-$C_{12}$alkoxy groups ($C_1$-$C_8$alkoxy groups) are straight-chain or branched alkoxy groups, e.g. methoxy, ethoxy, n-propoxy, isopropoxy, n-butoxy, sec-butoxy, tert-butoxy, amyloxy, isoamyloxy or tert-amyloxy, heptyloxy, octyloxy, isooctyloxy, nonyloxy, decyloxy, undecyloxy and dodecyloxy.

$C_1$-$C_{12}$alkylthio groups ($C_1$-$C_8$ alkylthio groups) are straight-chain or branched alkylthio groups and have the same preferences as the akoxy groups, except that oxygen is exchanged against sulfur.

$C_1$-$C_{12}$alkylene is bivalent $C_1$-$C_{12}$alkyl, i.e. alkyl having two (instead of one) free valencies, e.g. trimethylene or tetramethylene.

A cycloalkyl group is typically $C_3$-$C_8$cycloalkyl, such as, for example, cyclopentyl, cyclohexyl, cycloheptyl, or cyclooctyl, which may be unsubstituted or substituted.

In several cases it is advantageous to in addition to the photoinitiator employ a sensitizer compound. Examples of suitable sensitizer compounds are disclosed in WO 06/008251, page 36, line 30 to page 38, line 8, the disclosure of which is hereby incorporated by reference. As sensitizer inter alia benzophenone compounds as described above can be employed.

The unsaturated compounds may include one or more olefinic double bonds. They may be of low (monomeric) or high (oligomeric) molecular mass. Examples of monomers containing a double bond are alkyl, hydroxyalkyl or amino acrylates, or alkyl, hydroxyalkyl or amino methacrylates, for example methyl, ethyl, butyl, 2-ethylhexyl or 2-hydroxyethyl acrylate, isobornyl acrylate, methyl methacrylate or ethyl methacrylate. Silicone acrylates are also advantageous. Other examples are acrylonitrile, acrylamide, methacrylamide, N-substituted (meth)acrylamides, vinyl esters such as vinyl acetate, vinyl ethers such as isobutyl vinyl ether, styrene, alkyl- and halostyrenes, N-vinylpyrrolidone, vinyl chloride or vinylidene chloride.

Examples of monomers containing two or more double bonds are the diacrylates of ethylene glycol, propylene glycol, neopentyl glycol, hexamethylene glycol or of bisphenol A, and 4,4'-bis(2-acryl-oyloxyethoxy)diphenylpropane, trimethylolpropane triacrylate, pentaerythritol triacrylate or tetraacrylate, vinyl acrylate, divinylbenzene, divinyl succinate, diallyl phthalate, triallyl phosphate, triallyl isocyanurate or tris(2-acryloylethyl) isocyanurate.

Examples of polyunsaturated compounds of relatively high molecular mass (oligomers) are acrylated epoxy resins, polyesters containing acrylate-, vinyl ether- or epoxy-groups, and also polyurethanes and polyethers. Further examples of unsaturated oligomers are unsaturated polyester resins, which are usually prepared from maleic acid, phthalic acid and one or more diols and have molecular weights of from about 500 to 3000. In addition it is also possible to employ vinyl ether monomers and oligomers, and also maleate-terminated oligomers with polyester, polyurethane, polyether, polyvinyl ether and epoxy main chains. Of particular suitability are combinations of oligomers which carry vinyl ether groups and of polymers as described in WO90/01512. However, copolymers of vinyl ether and maleic acid-functionalized monomers are also suitable. Unsaturated oligomers of this kind can also be referred to as prepolymers.

Particularly suitable examples are esters of ethylenically unsaturated carboxylic acids and polyols or polyepoxides, and polymers having ethylenically unsaturated groups in the chain or in side groups, for example unsaturated polyesters, polyamides and polyurethanes and copolymers thereof, polymers and copolymers containing (meth)acrylic groups in side chains, and also mixtures of one or more such polymers.

Examples of unsaturated carboxylic acids are acrylic acid, methacrylic acid, crotonic acid, itaconic acid, cinnamic acid, and unsaturated fatty acids such as linolenic acid or oleic acid. Acrylic and methacrylic acid are preferred.

Suitable polyols are aromatic and, in particular, aliphatic and cycloaliphatic polyols. Examples of aromatic polyols are hydroquinone, 4,4'-dihydroxydiphenyl, 2,2-di(4-hydroxyphenyl)propane, and also novolaks and resols. Examples of polyepoxides are those based on the above-mentioned polyols, especially the aromatic polyols, and epichlorohydrin. Other suitable polyols are polymers and copolymers containing hydroxyl groups in the polymer chain or in side groups, examples being polyvinyl alcohol and copolymers thereof or polyhydroxyalkyl methacrylates or copolymers thereof. Further polyols which are suitable are oligoesters having hydroxyl end groups.

Examples of aliphatic and cycloaliphatic polyols are alkylenediols having preferably 2 to 12 C atoms, such as ethylene glycol, 1,2- or 1,3-propanediol, 1,2-, 1,3- or 1,4-butanediol, pentanediol, hexanediol, octanediol, dodecanediol, diethylene glycol, triethylene glcyol, polyethylene glycols having molecular weights of preferably from 200 to 1500, 1,3-cyclopentanediol, 1,2-, 1,3- or 1,4-cyclohexanediol, 1,4-dihydroxymethylcyclohexane, glycerol, tris(p-hydroxyethyl)amine, trimethylolethane, trimethylolpropane, pentaerythritol, dipentaerythritol and sorbitol.

The polyols may be partially or completely esterified with one carboxylic acid or with different unsaturated carboxylic acids, and in partial esters the free hydroxyl groups may be modified, for example etherified or esterified with other carboxylic acids.

Examples of esters are: trimethylolpropane triacrylate, trimethylolethane triacrylate, trimethylolpropane trimethacrylate, trimethylolethane trimethacrylate, tetramethylene glycol dimethacrylate, triethylene glycol dimethacrylate, tetraethylene glycol diacrylate, tripropylene glycol diacrylate (TPGDA), dipropylene glycol diacrylate (DPGDA), pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol pentaacrylate, dipentaerythritol hexaacrylate, tripentaerythritol octaacrylate, pentaerythritol dimethacrylate, pentaerythritol trimethacrylate, dipentaerythritol dimethacrylate, dipentaerythritol tetramethacrylate, tripentaerythritol octamethacrylate, pentaerythritol diitaconate, dipentaerythritol tris-itaconate, dipentaerythritol pentaitaconate, dipentaerythritol hexaitaconate, ethylene glycol diacrylate, 1,3-butanediol diacrylate, 1,3-butanediol dimethacrylate, 1,4-butanediol diitaconate, sorbitol triacrylate, sorbitol tetraacrylate, pentaerythritol-modified triacrylate, sorbitol tetra methacrylate, sorbitol pentaacrylate, sorbitol hexaacrylate, oligoester acrylates and methacrylates, glycerol diacrylate and triacrylate, 1,4-cyclohexane diacrylate, bisacrylates and bismethacrylates of polyethylene glycol with a molecular weight of from 200 to 1500, or mixtures thereof. Also suitable as polymerizable components are triacrylate of singly to vigintuply alkoxylated, more preferably singly to vigintuply ethoxylated trimethylolpropane, singly to vigintuply propoxylated glycerol or singly to vigintuply ethoxylated and/or propoxylated pentaerythritol, such as, for example, ethoxylated trimethylol propane triacrylate (TMEOPTA).

Also suitable as polymerizable components are the amides of identical or different, unsaturated carboxylic acids with aromatic, cycloaliphatic and aliphatic polyamines having preferably 2 to 6, especially 2 to 4, amino groups. Examples of such polyamines are ethylenediamine, 1,2- or 1,3-propylenediamine, 1,2-, 1,3- or 1,4-butylenediamine, 1,5-pentylenediamine, 1,6-hexylenediamine, octylenediamine, dodecylenediamine, 1,4-diaminocyclohexane, isophoronediamine, phenylenediamine, bisphenylenediamine, di-ß-aminoethyl ether, diethylenetriamine, triethylenetetramine, di(ß-aminoethoxy)- or di(ß-aminopropoxy)ethane. Other suitable polyamines are polymers and copolymers, preferably with additional amino groups in the side chain, and oligoamides having amino end groups. Examples of such unsaturated amides are methylenebisacrylamide, 1,6-hexamethylenebisacrylamide, diethylenetriaminetrismethacrylamide, bis(methacrylamido-propoxy)ethane, ß-methacrylamidoethyl methacrylate and N[(ß-hydroxy-ethoxy)ethyl]acrylamide.

Suitable unsaturated polyesters and polyamides are derived, for example, from maleic acid and from diols or diamines. Some of the maleic acid can be replaced by other dicarboxylic acids. They can be used together with ethylenically unsaturated comonomers, for example styrene. The polyesters and polyamides may also be derived from dicarboxylic acids and from ethylenically unsaturated diols or diamines, especially from those with relatively long chains of, for example 6 to 20 C atoms. Examples of polyurethanes are those composed of saturated or unsaturated diisocyanates and of unsaturated or, respectively, saturated diols. Polymers with (meth)acrylate groups in the side chain are likewise known. They may, for example, be reaction products of epoxy resins based on novolaks with (meth)acrylic acid, or may be homo- or copolymers of vinyl alcohol or hydroxyalkyl derivatives thereof which are esterified with (meth)acrylic acid, or may be homo- and copolymers of (meth)acrylates which are esterified with hydroxyalkyl (meth)acrylates.

Other suitable polymers with acrylate or methacrylate groups in the side chains are, for example, solvent soluble or alkaline soluble polyimide precursors, for example poly (amic acid ester) compounds, having the photopolymerizable side groups either attached to the backbone or to the ester groups in the molecule, i.e. according to EP624826. Such oligomers or polymers can be formulated with optionally reactive diluents, like polyfunctional (meth)acrylates in order to prepare highly sensitive polyimide precursor resists.

Examples of polymerizable components are also polymers or oligomers having at least two ethylenically unsaturated groups and at least one carboxyl function within the molecule structure, such as a resin obtained by the reaction of a saturated or unsaturated polybasic acid anhy-dride with a product of the reaction of an epoxy compound and an unsaturated monocarboxylic acid, for example, photosensitive compounds as described in JP 10-301276 and commercial products such as for example EB9696, UCB Chemicals; KAYARAD TCR1025, Nippon Kayaku Co., LTD., NK OLIGO EA-6340, EA-7440 from Shin-Nakamura Chemical Co., Ltd., or an addition product formed between a carboxyl group-containing resin and an unsaturated compound having an α,β-unsaturated double bond and an epoxy group (for example, ACA200M, Daicel Industries, Ltd.). Additional commercial products as examples of polymerizable component are ACA200, ACA210P, ACA230AA, ACA250, ACA300, ACA320 from Daicel Chemical Industries, Ltd.

The polymerizable compound, may also comprise urethane (meth)acrylates, epoxy (meth)acrylates or carbonate (meth)acrylates.

Urethane (meth)acrylates are obtainable for example by reacting polyisocyanates with hydroxyalkyl (meth)acrylates and optionally chain extenders such as diols, polyols, diamines, polyamines, dithiols or polythiols.

The urethane (meth)acrylates preferably have a number-average molar weight $M_n$ of 500 to 20 000, in particular of 500 to 10 000 and more preferably 600 to 3000 g/mol (determined by gel permeation chromatography using tetrahydrofuran and polystyrene as standard).

The urethane (meth)acrylates preferably have a (meth) acrylic group content of 1 to 5, more preferably of 2 to 4, mol per 1000 g of urethane (meth)acrylate.

Epoxy (meth)acrylates are obtainable by reacting epoxides with (meth)acrylic acid. Examples of suitable epoxides include epoxidized olefins, aromatic glycidyl ethers or aliphatic glycidyl ethers, preferably those of aromatic or aliphatic glycidyl ethers.

Examples of possible epoxidized olefins include ethylene oxide, propylene oxide, isobutylene oxide, 1-butene oxide, 2-butene oxide, vinyloxirane, styrene oxide or epichlorohydrin, preference being given to ethylene oxide, propylene oxide, isobutylene oxide, vinyloxirane, styrene oxide or epichlorohydrin, particular preference to ethylene oxide, propylene oxide or epichlorohydrin, and very particular preference to ethylene oxide and epichlorohydrin.

Aromatic glycidyl ethers are, for example, bisphenol A diglycidyl ether, bisphenol F diglycidyl ether, bisphenol B diglycidyl ether, bisphenol S diglycidyl ether, hydroquinone diglycidyl ether, alkylation products of phenol/dicyclopentadiene, e.g., 2,5-bis[(2,3-epoxypropoxy)phenyl]octahydro-4,7-methano-5H-indene (CAS No. [13446-85-0]), tris[4-(2,3-epoxypropoxy)phenyl]methane isomers (CAS No. [66072-39-7]), phenol-based epoxy novolaks (CAS No. [9003-35-4]), and cresol-based epoxy novolaks (CAS No. [37382-79-9]).

Examples of aliphatic glycidyl ethers include 1,4-butanediol diglycidyl ether, 1,6-hexanediol diglycidyl ether, trimethylolpropane triglycidyl ether, pentaerythritol tetraglycidyl ether, 1,1,2,2-tetrakis[4-(2,3-epoxypropoxy)phenyl] ethane (CAS No. [27043-37-4]), diglycidyl ether of polypropylene glycol (α,ω-bis(2,3-epoxypropoxy)poly (oxypropylene), CAS No. [16096-30-3]) and of hydrogenated bisphenol A (2,2-bis[4-(2,3-epoxypropoxy)cyclohexyl]propane, CAS No. [13410-58-7]).

The epoxy (meth)acrylates preferably have a number-average molar weight $M_n$ of 200 to 20 000, more preferably of 200 to 10 000 g/mol, and very preferably of 250 to 3000 g/mol; the amount of (meth)acrylic groups is preferably 1 to 5, more preferably 2 to 4, per 1000 g of epoxy (meth) acrylate (determined by gel permeation chromatography using polystyrene as standard and tetrahydrofuran as eluent).

Carbonate (meth)acrylates comprise on average preferably 1 to 5, especially 2 to 4, more preferably 2 to 3 (meth)acrylic groups, and very preferably 2 (meth)acrylic groups.

The number-average molecular weight $M_n$ of the carbonate (meth)acrylates is preferably less than 3000 g/mol, more preferably less than 1500 g/mol, very preferably less than 800 g/mol (determined by gel permeation chromatography using polystyrene as standard, tetrahydrofuran as solvent).

The carbonate (meth)acrylates are obtainable in a simple manner by transesterifying carbonic esters with polyhydric, preferably dihydric, alcohols (diols, hexanediol for example) and subsequently esterifying the free OH groups with (meth)acrylic acid, or else by transesterification with (meth)acrylic esters, as described for example in EP-A 92 269. They are also obtainable by reacting phosgene, urea derivatives with polyhydric, e.g., dihydric, alcohols.

Also conceivable are (meth)acrylates of polycarbonate polyols, such as the reaction product of one of the aforementioned diols or polyols and a carbonic ester and also a hydroxyl-containing (meth)acrylate.

Examples of suitable carbonic esters include ethylene carbonate, 1,2- or 1,3-propylene carbonate, dimethyl carbonate, diethyl carbonate or dibutyl carbonate.

Examples of suitable hydroxyl-containing (meth)acrylates are 2-hydroxyethyl (meth)acrylate, 2- or 3-hydroxypropyl (meth)acrylate, 1,4-butanediol mono(meth)acrylate, neopentyl glycol mono(meth)acrylate, glyceryl mono- and di(meth)acrylate, trimethylolpropane mono- and di(meth) acrylate, and pentaerythritol mono-, di-, and tri(meth)acrylate.

Particularly preferred carbonate (meth)acrylates are those of the formula:

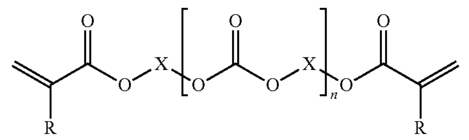

in which R is H or $CH_3$, X is a $C_2$-$C_{18}$ alkylene group, and n is an integer from 1 to 5, preferably 1 to 3.

R is preferably H and X is preferably $C_2$ to $C_{10}$ alkylene, examples being 1,2-ethylene, 1,2-propylene, 1,3-propylene, 1,4-butylene, and 1,6-hexylene, more preferably $C_4$ to $C_8$ alkylene. With very particular preference X is $C_6$ alkylene.

The carbonate (meth)acrylates are preferably aliphatic carbonate (meth)acrylates.

As diluent, a mono- or multi-functional ethylenically unsaturated compound, or mixtures of several of said compounds, can be included in the above composition up to 70% by weight based on the solid portion of the composition.

The invention also provides compositions comprising as polymerizable component at least one ethylenically unsaturated photopolymerizable compound which is emulsified or dissolved in water, or organic solvents.

The UV curable composition comprises (a) 1.0 to 20.0, especially 1.0 to 15.0, very especially 3.0 to 10.0% by weight of photoinitiator, (b) 99.0 to 80.0, especially 99.0 to 85.0, very especially 97.0 to 90.0% by weight of a binder (unsaturated compound(s) including one or more olefinic double bonds), wherein the sum of components a) and b) adds up to 100%.

In a preferred embodiment the UV curable composition comprises an epoxy-acrylate (10 to 60%) and one or several (monofunctional and multifunctional) acrylates (20 to 89%) and one, or several photoinitiators (1 to 15%).

The epoxy-acrylate is selected from aromatic glycidyl ethers aliphatic glycidyl ethers. Aromatic glycidyl ethers are, for example, bisphenol A diglycidyl ether, bisphenol F diglycidyl ether, bisphenol B diglycidyl ether, bisphenol S diglycidyl ether, hydroquinone diglycidyl ether, alkylation products of phenol/dicyclopentadiene, e.g., 2,5-bis[(2,3-epoxypropoxy)phenyl]octahydro-4,7-methano-5H-indene (CAS No. [13446-85-0]), tris[4-(2,3-epoxypropoxy)phenyl] methane isomers (CAS No. [66072-39-7]), phenol-based epoxy novolaks (CAS No. [9003-35-4]), and cresol-based epoxy novolaks (CAS No. [37382-79-9]). Examples of aliphatic glycidyl ethers include 1,4-butanediol diglycidyl ether, 1,6-hexanediol diglycidyl ether, trimethylolpropane triglycidyl ether, pentaerythritol tetraglycidyl ether, 1,1,2,2-tetrakis[4-(2,3-epoxypropoxy)phenyl]ethane (CAS No. [27043-37-4]), diglycidyl ether of polypropylene glycol ($\alpha$,$\omega$-bis(2,3-epoxypropoxy)poly(oxypropylene), CAS No. [16096-30-3]) and of hydrogenated bisphenol A (2,2-bis[4-(2,3-epoxypropoxy)cyclohexyl]propane, CAS No. [13410-58-7]).

The one or several acrylates are preferably multifunctional monomers which are selected from trimethylolpropane triacrylate, trimethylolethane triacrylate, trimethylolpropane trimethacrylate, trimethylolethane trimethacrylate, tetramethylene glycol dimethacrylate, triethylene glycol dimethacrylate, tetraethylene glycol diacrylate, tripropylene glycol diacrylate (TPGDA), dipropylene glycol diacrylate (DPGDA), pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol pentaacrylate, dipentaerythritol hexaacrylate, tripentaerythritol octaacrylate, pentaerythritol dimethacrylate, pentaerythritol trimethacrylate, dipentaerythritol dimethacrylate, dipentaerythritol tetramethacrylate, tripentaerythritol octamethacrylate, pentaerythritol diitaconate, dipentaerythritol tris-itaconate, dipentaerythritol pentaitaconate, dipentaerythritol hexaitaconate, ethylene glycol diacrylate, 1,3-butanediol diacrylate, 1,3-butanediol dimethacrylate, 1,4-butanediol diitaconate, sorbitol triacrylate, sorbitol tetraacrylate, pentaerythritol-modified triacrylate, sorbitol tetra methacrylate, sorbitol pentaacrylate, sorbitol hexaacrylate, oligoester acrylates and methacrylates, glycerol diacrylate and triacrylate, 1,4-cyclohexane diacrylate, bisacrylates and bismethacrylates of polyethylene glycol with a molecular weight of from 200 to 1500, triacrylate of singly to vigintuply alkoxylated, more preferably singly to vigintuply ethoxylated trimethylolpropane, singly to vigintuply propoxylated glycerol or singly to vigintuply ethoxylated and/or propoxylated pentaerythritol, such as, for example, ethoxylated trimethylol propane triacrylate (TMEOPTA) and or mixtures thereof.

In another preferred embodiment the UV curable composition comprises:

| | |
|---|---|
| Bisphenol A epoxyacrylate with 25% TPGDA | 1-35% by weight |
| Dipropylene glycol diacrylate (DPGDA) | 30-45% by weight |
| Ethoxylated trimethylol propane triacrylate (TMEOPTA) | 10-50% by weight |
| Reactive tertiary amine | 1-15% by weight |
| Photoinitiator: | 5-10% by weight |

The amounts of the components of the of UV curable composition add up to 100% by weight.

In another preferred embodiment the UV curable composition comprises:

| | |
|---|---|
| Tripropylene glycol diacrylate (TPGDA) | 1-25% by weight |
| Dipropylene glycol diacrylate (DPGDA) | 30-45% by weight |
| Ethoxylated trimethylol propane triacrylate (TMEOPTA) | 10-50% by weight |
| Reactive tertiary amine | 1-15% by weight |
| Photoinitiator: | 5-9% by weight |

The amounts of the components of the of UV curable composition add up to 100% by weight.

The photoinitiator is preferably a blend of an alpha-hydroxy ketone, alpha-alkoxyketone or alpha-aminoketone compound of the formula (XI) and a benzophenone compound of the formula (X); or a blend of an alpha-hydroxy ketone, alpha-alkoxyketone or alpha-aminoketone compound of the formula (XI), a benzophenone compound of the formula (X) and an acylphosphine oxide compound of the formula (XII).

The curable composition may comprise various additives. Examples thereof include thermal inhibitors, coinitiators and/or sensitizers, light stabilisers, optical brighteners, fillers and pigments, as well as white and coloured pigments, dyes, antistatics, wetting agents, flow auxiliaries, lubricants, waxes, anti-adhesive agents, dispersants, emulsifiers, antioxidants; fillers, e.g. talcum, gypsum, silicic acid, rutile, carbon black, zinc oxide, iron oxides; reaction accelerators, thickeners, matting agents, antifoams, leveling agents and other adjuvants customary, for example, in lacquer, ink and coating technology.

Examples of coinitiators/sensitisers are especially aromatic carbonyl compounds, for example benzophenone, thioxanthone, especially isopropyl thioxanthone, anthraquinone and 3-acylcoumarin derivatives, terphenyls, styryl ketones, and also 3-(aroylmethylene)-thiazolines, camphor quinone, and also eosine, rhodamine and erythrosine dyes. Amines, for example, can also be regarded as photosensitisers when the photoinitiator consists of a benzophenone or benzophenone derivative.

Examples of Light Stabilizers are:

Phosphites and phosphonites (processing stabilizer), for example triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, tris(2,4-di-tert-butylphenyl) phosphite, diisodecyl pentaerythritol diphosphite, bis(2,4-di-tert-butylphenyl)pentaerythritol diphosphite, bis(2,4-di-cumylphenyl) pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl)methyl phosphite, bis(2,4-di-tert-butyl-6-methylphenyl)ethyl phosphite, 6-fluoro-2,4,8,10-tetra-tert-butyl-12-methyl-dibenz[d,g]-1,3,2-dioxaphosphocin, 2,2',2"-nitrilo[triethyltris(3,3',5,5'-tetra-tert-butyl-1,1'-biphenyl-2,2'-diyl)phosphite], 2-ethylhexyl (3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane, phosphorous acid, mixed 2,4-bis(1,1-dimethylpropyl)phenyl and 4-(1,1-dimethylpropyl)phenyl triesters (CAS No. 939402-02-5), Phosphorous acid, triphenyl ester, polymer with alpha-hydro-omega-hydroxypoly[oxy (methyl-1,2-ethanediyl)], $C_{10-16}$ alkyl esters (CAS No. 1227937-46-3). The following phosphites are especially preferred: Tris(2,4-di-tert-butylphenyl) phosphite, tris(nonylphenyl) phosphite,

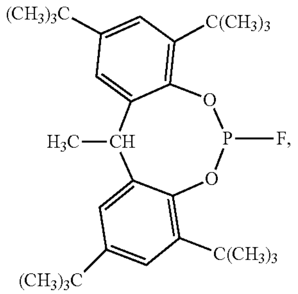

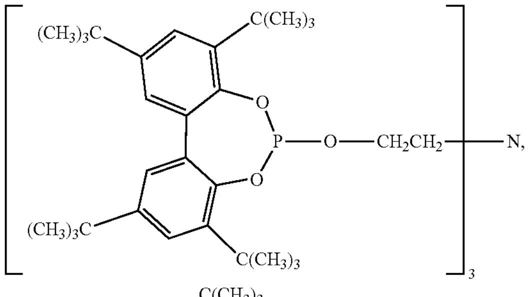

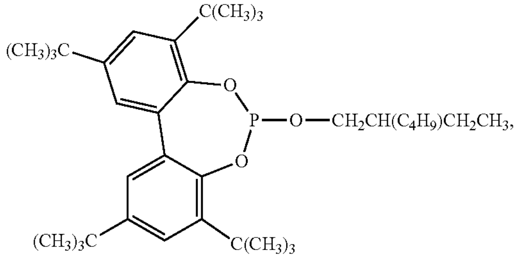

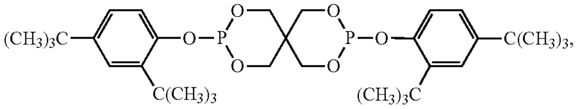

-continued

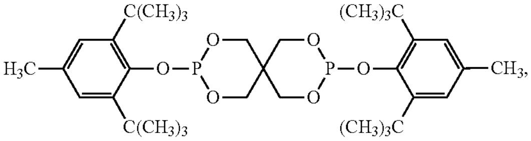

and

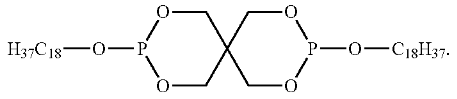

Quinone Methides of the Formula

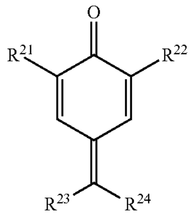

(providing long term shelf life stability), wherein $R^{21}$ and $R^{22}$ independently of each other are $C_1$-$C_{18}$alkyl, $C_5$-$C_{12}$cycloalkyl, $C_7$-$C_{15}$-phenylalkyl, optionally substituted $C_6$-$C_{10}$aryl;

$R^{23}$ and $R^{24}$ independently of each other are H, optionally substituted $C_6$-$C_{10}$-aryl, 2-,3-,4-pyridyl, 2-,3-furyl or thienyl, COOH, $COOR^{25}$, $CONH_2$, $CONHR^{25}$, $CONR^{25}R^{26}$, —CN, —$COR^{25}$, —$OCOR^{25}$, —$OPO(OR^{25})_2$, wherein $R^{25}$ and $R^{26}$ are independently of each other $C_1$-$C_8$alkyl, or phenyl. Quinone methides are preferred, wherein $R^{21}$ and $R^{22}$ are tert-butyl; $R^{23}$ is H, and $R^{24}$ is optionally substituted phenyl, COOH, $COOR^{25}$, $CONH_2$, $CONHR^{25}$, $CONR^{25}R^{26}$, —CN, —$COR^{25}$, —$OCOR^{25}$, —$OPO(OR^{25})_2$, wherein $R^{25}$ and $R^{26}$ are $C_1$-$C_8$alkyl, or phenyl. Examples of quinone methides are

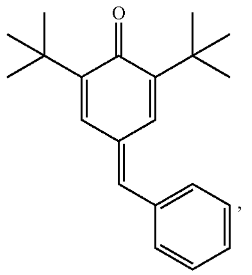

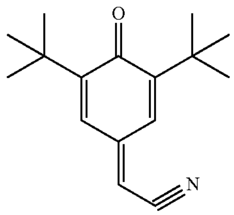

and

-continued

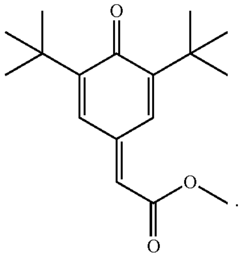

The quinone methides may be used in combination with highly sterically hindered nitroxyl radicals as described, for example, in US20110319535.

The quinone methides are used typically in a proportion of from about 0.01 to 0.3% by weight, preferably from about 0.04 to 0.15% by weight, based on the total weight of the UV curable composition.

Leveling agents used, which additionally also serve to improve scratch resistance, can be the products TEGO® Rad 2100, TEGO® Rad 2200, TEGO® Rad 2300, TEGO® Rad 2500, TEGO® Rad 2600, TEGO® Rad 2700 and TEGO® Twin 4000, likewise obtainable from Tego. Such auxiliaries are obtainable from BYK, for example as BYK®-300, BYK®-306, BYK®-307, BYK®-310, BYK®-320, BYK®-322, BYK®-331, BYK®-333, BYK®-337, BYK®-341, Byk® 354, Byk® 361 N, BYK®-378 and BYK®-388.

Leveling agents are typically used in a proportion of from about 0.005 to 1.0% by weight, preferably from about 0.01 to 0.2% by weight, based on the total weight of the UV curable composition.

In a preferred embodiment the protective layer is derived from an UV curable composition which comprises an epoxy-acrylate from the CRAYNOR® Sartomer Europe range (10 to 60%) and one or several acrylates (monofunctional and multifunctional), monomers which are available from Sartomer Europe (20 to 88.99%) and one, or several photoinitiators (1 to 15%) such as Darocure® 1173 and a levelling agent such as BYK®361 (0.01 to 1%) from BYK Chemie.

In a preferred embodiment of the present invention the security element has the following layer structure:

(a) a transparent substrate, such as for example a polyethylene terephthalate (PET) film, or a biaxially oriented polypropylene (BOPP) film, and
(b) on at least part of the substrate surface a (reflective) metal layer having a thickness of from 10 to 500 nm, such as for example a silver, or aluminum layer,
(c) optionally on at least part of the metal layer a dielectric layer having a thickness of 2 to 10 nm, such as for example a $Al_2O_3$ layer, or a $SiO_2$ layer,
(d) on at least part of the metal layer, or the dielectric layer, a layer obtained by overcoating the metal layer, or the dielectric layer with a composition, comprising
(i) silver nanoparticles having an average diameter of from 5 to 500 nm, especially 20 nm to 500 nm,
(ii) a solvent,
(iii) (surface) stabilizing agent(s), and
(iv) optionally an organic binder, and
(e) a protective layer on top of the layer (d).

The layer d) comprises silver nanoparticles having an average diameter of from 5 to 500 nm, especially 20 nm to 500 nm, (surface) stabilizing agent(s) and optionally a binder. In a preferred embodiment the layer d) consists of silver nanoparticles having an average diameter of from 5 to 500 nm, especially 20 nm to 500 nm and (surface) stabilizing agent(s). In another preferred embodiment the layer d) consists of silver nanoparticles having an average diameter of from 5 to 500 nm, especially 20 nm to 500 nm, (surface) stabilizing agent(s) and a binder.

The amount of (surface) stabilizing agent(s) relative to the amount of silver nanoparticles in layer d) is from 0.1 to 20% by weight of (surface) stabilizing agent(s) relative to the weight of silver nanoparticles, especially from 0.5 to 15% by weight of (surface) stabilizing agent(s) relative to the weight of silver nanoparticles.

The amount of binder relative to the amount of silver nanoparticles in layer d) is from 0 to 100% by weight binder relative to the weight of silver nanoparticles, especially from 0 to 50% by weight binder relative to the weight of silver nanoparticles.

The solvent is preferably selected from $C_2$-$C_6$ alcohols, ketones, esters, ethers, ether-alcohols, mixtures thereof and mixtures with water.

The (surface) stabilizing agent(s) is preferably selected from compounds of formula (Ia), especially cpds. (A-1), (A-2), (A-3), (A-4), (A-5), (A-6), (A-7), (A-8), (A-9) and (A-10), compounds of formula (IIb), especially cpds. (B-1), (B-2), (B-3), (B-4), (B-5), (B-6) and (B-7), compounds of formula (IIc), especially cpds. (C-1), (C-2), (C-3), (C-4), (C-5), (C-6), (C-7), (C-8) and (C-9) and mixtures thereof.

The binder is preferably selected from the group consisting of nitrocellulose, ethyl cellulose, cellulose acetate, cellulose acetate propionate (CAP), cellulose acetate butyrate (CAB), hydroxyethyl cellulose (HEC), hydroxypropyl cellulose (HPC), alcohol soluble propionate (ASP), vinyl chloride, vinyl acetate copolymers, vinyl acetate, vinyl, acrylic, polyurethane, polyamide, rosin ester, hydrocarbon, aldehyde, ketone, urethane, polythyleneterephthalate, terpene phenol, polyolefin, silicone, cellulose, polyamide, polyester, rosin ester resins, shellac and mixtures thereof. Most preferred are soluble cellulose derivatives such as hydroxylethyl cellulose, hydroxypropyl cellulose, nitrocellulose, carboxymethylcellulose as well as chitosan and agarose, in particular hydroxyethyl cellulose and hydroxypropyl cellulose.

The protective layer (e) is applied on top of layer (d). The protective layer is preferably derived from an UV lacquer which comprises an epoxy-acrylate from the CRAYNOR® Sartomer Europe range (10 to 60%) and one or several acrylates (monofunctional and multifunctional), monomers which are available from Sartomer Europe (20 to 88.99%) and one, or several photoinitiators (1 to 15%) such as Darocure® 1173 and a levelling agent such as BYK®361 (0.01 to 1%) from BYK Chemie.

In another preferred embodiment the UV curable composition comprises:

| | |
|---|---|
| Bisphenol A epoxyacrylate with 25% TPGDA | 1-35% by weight |
| Dipropylene glycol diacrylate (DPGDA) | 30-45% by weight |
| Ethoxylated trimethylol propane triacrylate (TMEOPTA) | 10-50% by weight |
| Reactive tertiary amine | 1-15% by weight |
| Photoinitiator: | 5-10% by weight |

The amounts of the components—the of UV curable composition add up to 100% by weight. In another preferred embodiment the UV curable composition comprises:

| | |
|---|---|
| Tripropylene glycol diacrylate (TPGDA) | 1-25% by weight |
| Dipropylene glycol diacrylate (DPGDA) | 30-45% by weight |
| Ethoxylated trimethylol propane triacrylate (TMEOPTA) | 10-50% by weight |
| Reactive tertiary amine | 1-15% by weight |
| Photoinitiator: | |

The amounts of the components—the of UV curable composition add up to 100% by weight.

The maximum absorption wavelength of the silver nanoparticles is controlled by varying the amount of (surface) stabilizing agent(s) and optionally binder relative to the amount of silver nanoparticles in layer (d).

In a particularly preferred embodiment of the present invention the security element has the following layer structure:

(a) a polyethylene terephthalate (PET) film, or a biaxially oriented polypropylene (BOPP) film, and (b) on at least part of the substrate surface an aluminum layer having a thickness of from 10 to 500 nm, (c) on at least part of the metal layer a $Al_2O_3$ layer having a thickness of 2 to 10 nm, especially 2 to 5 nm, (d) on at least part of the $Al_2O_3$ layer, a layer obtained by coating the $Al_2O_3$ layer with a composition, comprising (i) silver nanoparticles having an average diameter of from 5 to 500 nm, especially 20 nm to 500 nm, (ii) a solvent, (iii) (surface) stabilizing agent(s), and (iv) optionally a binder, which is selected from the group consisting of nitro cellulose, vinyl chloride, vinyl acetate copolymers, vinyl, acrylic, urethane, polythyleneterephthalate, terpene phenol, polyolefin, silicone, cellulose, polyamide, polyester and rosin ester resins or mixtures thereof, and (e) a protective layer on top of layer (d), which is preferably derived from an UV lacquer which comprises an epoxy-acrylate from the CRAYNOR® Sartomer Europe range (10 to 60%) and one or several acrylates (monofunctional and multifunctional), monomers which are available from Sartomer Europe (20 to 88.99%) and one, or several photoinitiators (1 to 15%) such as Darocure® 1173 and a levelling agent such as BYK®361 (0.01 to 1%) from BYK Chemie.

The (surface) stabilizing agent(s) is preferably selected from compounds of formula (Ia), especially cpds. (A-1), (A-2), (A-3), (A-4), (A-5), (A-6), (A-7), (A-8), (A-9) and (A-10), compounds of formula (IIb), especially cpds. (B-1), (B-2), (B-3), (B-4), (B-5), (B-6) and (B-7), compounds of formula (IIc), especially cpds. (C-1), (C-2), (C-3), (C-4), (C-5), (C-6), (C-7), (C-8) and (C-9) and mixtures thereof.

The full width of half maximum (FWHM) of the absorption peak in the spectrum of particles in layer d) of the present invention is preferably within the range of 80 to 300 nm Of interest are pigments having narrow-band absorption in the infrared range, in particular in the 700 nm to 1100 nm wavelength range, which are detectable by the commercially available silicon photodetector devices, such as photodiodes, CMOS- and CCD-cameras.

Using a couple of narrow band absorbing pigments in the said IR wavelength range allows noteworthy to implement graphic 'multicolor' security designs, comprising one or more invisible 'infrared colors'.

In a particularly preferred embodiment, three IR-absorbing pigments, absorbing in the 700 to 800 nm, the 800 to 900 nm, and the 900 to 1000 nm range, respectively, may be used to print a trichromic picture in the infrared region of the electromagnetic spectrum, which is invisible to the unaided human eye.

In said embodiment, three IR-absorbing pigments could be mimicked by controlling the maximum absorption wavelength of the silver nanoparticles by variation of the concentration of the binder, so that the maximum absorption wavelength is in the range of 700 to 800 nm, 800 to 900 nm and 900 to 1000 nm range, respectively.

The picture can be camouflaged by overprinting it with one or more IR-transparent visible colors. The resulting trichromic IR-picture may then be visualized or inspected with the help of a corresponding electronic 'IR-color' camera and a visual color display.

In a particularly preferred embodiment the layer d) comprises areas with different silver nanoparticles and/or different amounts of (surface) stabilizing agent(s) and optionally binder. In said embodiment the maximum absorption wavelength of the different areas is in the range of 750 to 800 nm, 800 to 900 nm and 900 to 1000 nm range, respectively, or the maximum absorption wavelength of the different areas is in the range of 700 to 800 nm, 800 to 900 nm and 900 to 1600 nm range, respectively. The different areas have a defined shape, such as, for example, a symbol, a stripe, a geometrical shape, a design, lettering, an alphanumeric character, the representation of an object or parts thereof.

Areas having a maximum absorption wavelength being within the range of 900 to 1600 nm can be achieved with the silver nanoplatelets described, for example, in WO2011064162 showing a blue color in transmission and a gold color in reflection.

The method of producing the security element of the present invention comprises the steps of a) providing a substrate having a surface, which surface may contain indicia or other visible features;

b) applying, on top of at least part of the said substrate surface a metal layer having a thickness of from 5 to 1000 nm, especially 10 to 500 nm, c) optionally applying on at least part of the metal layer a dielectric layer having a thickness of 1 to 20 nm, especially 2 to 10 nm, d) applying on at least part of the metal layer, or the dielectric layer, a composition, comprising (i) silver nanoparticles having an average diameter of from 5 to 500 nm, especially 20 nm to 500 nm, (ii) a solvent, (iii) (surface) stabilizing agent(s), and (iv) optionally a binder, and curing and/or drying the composition, and e) applying a protective layer on top of layer (d).

No precisely defined spacing layer is required. The layer d) can be applied by a simple coating/printing step, which allows for mass-scale production.

The metal layer b) can be applied by a conventional deposition process such as physical vapor deposition (PVD), or sputtering.

The dielectric layer c) can be formed on metal layer b) by a conventional deposition process such as PVD, chemical vapor deposition (CVD), plasma enhanced chemical vapor deposition (PECVD), reactive DC sputtering, or RF sputtering. Al, Ni and Cr have natural oxide layers which may represent layer c).

Layers d) and e) can be applied by conventional coating devices and methods known to those skilled in the art. The protective layer may be obtained by a transparent overcoat subsequently being UV-cure. The composition for deposition of protective layer e) is designed such as not to dissolve the layer d). This may be achieved, for example, by using orthogonal solvents in the compositions for deposition of layers d) and e). The application of layers d) and e) is preferably done by gravure, flexographic, ink jet, or screen printing process.

The method of producing the security element of the present invention comprises preferably the steps of a) providing a substrate having a surface, which surface may contain indicia or other visible features, such as for example polyethylene terephthalate (PET) film, or a biaxially oriented polypropylene (BOPP) film;
b) applying on top of at least part of the said substrate surface an aluminum layer having a thickness of from 10 to 500 nm by PVD,
c) subjecting the aluminum layer to an oxygen-containing atmosphere, whereby an aluminum oxide layer having a thickness of 2 to 5 nm is formed,
d) applying on at least part of the aluminum layer, or the aluminum oxide layer, a composition, comprising
(i) silver nanoparticles having an average diameter of from 20 nm to 500 nm,
(ii) a solvent,
(iii) (surface) stabilizing agent(s), and
(iv) optionally a binder,
e) applying a protective layer on top of layer (d).

The application of layer d) is preferably done by gravure, flexographic, ink jet, or screen printing process. The application of layer e) is preferably done by gravure, offset, intaglio, flexographic, inkjet, or screen printing process.

The security element of the invention can be affixed to a variety of objects through various attachment mechanisms, such as pressure sensitive adhesives or hot stamping processes, to provide for enhanced security measures such as anticounterfeiting. The security article can be utilized in the form of a label, a tag, a ribbon, a security thread, and the like, for application to a variety of objects such as security documents, monetary currency, credit cards, merchandise, etc.

Accordingly, the present invention is also directed to a product, comprising the security element according to the present invention, and to the use of the security element according to the present invention for the prevention of counterfeit or reproduction, on a document of value, right, identity, a security label or a branded good.

A method of detecting the authenticity of the security element according to the present invention may comprise the steps of:

a) measuring an absorbance, reflectance or transmittance spectrum of the security document in the VIS/NIR range of the electromagnetic spectrum; and
b) comparing the spectrum measured under a) and/or information derived therefrom with a corresponding spectrum and/or information of an authentic security element.

Various aspects and features of the present invention will be further discussed in terms of the examples. The following examples are intended to illustrate various aspects and features of the present invention.

EXAMPLES

TEM analysis of dispersions and coatings was performed on EM 910 instrument from ZEISS in bright field mode at an e-beam acceleration voltage of 100 kV. At least 2 representative images with scale in different magnification were recorded in order to characterize the dominant particle morphology for each sample.

The "average diameter" is the number mean diameter of the particles which was determined from TEM images as maximum dimension of nanoplatelets, oriented parallel to the plane of the image, using Fiji image analysis software, based on the measurement of at least 100 randomly selected particles.

The "average thickness" is the number mean thickness of the particles which was measured manually as the maximum dimension of nanoplatelets, oriented perpendicular to the plane of the image, from a TEM image, based on the measurement of at least 20 randomly selected particles.

Example 1

3 inks are prepared according to Table 1:

| | Ag nanoplatelets concentration, % w/w | Nitrocellulose concentration, % w/w | (Surface) stabilizing agent(s) % w/w | 1-methoxy-2-propanol, % w/w |
|---|---|---|---|---|
| Ink 1 | 0.92 | 0 | 0.08 | 99 |
| Ink 2 | 0.92 | 0.1 | 0.08 | 98.9 |
| Ink 3 | 0.92 | 0.5 | 0.08 | 98.5 |

These inks are coated onto the shiny side of aluminium foil (24 μm thickness) and PET film (Melinex 506) for comparison with a wired handcoater #1 and dried with a hot-air drier.

Reflection spectra are recorded in the wavelength range of 350-1400 nm. Reflection spectra on PET foil are recorded with aluminium foil background.

A remarkable difference in spectra for identical coatings on aluminium foil and PET film is observed. Maximum absorption wavelength of Ag nanoplatelets can be tuned in the range of 600 to 940 nm by simple variation of binder concentration.

The synthesis of the silver nanoplatelets used in Example 1 is described in Example 1 of PCT/EP2019/078469, except that the addition of ethyl gallate is omitted.

The invention claimed is:

1. Security element, comprising
(a) a substrate, which optionally contains indicia or other visible features in or on its surface, and
(b) on at least part of the substrate surface a metal layer having a thickness of from 5 to 1000 nm,
(c) optionally on at least part of the metal layer a dielectric layer having a thickness of 1 to 20 nm,
(d) on at least part of the metal layer, or the dielectric layer, a layer obtained by overcoating the metal layer, or the dielectric layer with a composition, comprising
(i) silver nanoparticles having an average diameter of from 5 to 500 nm in an amount of 0.1 to 20% by weight,
(ii) a solvent in an amount of 50 to 99.8% by weight,
(iii) surface stabilizing agent(s) in an amount of 0.0001 to 5% by weight, and
(iv) optionally a binder in an amount of from 0 to 20% by weight, wherein the amounts of components (i), (ii), (iii), and (iv) are based on the total weight of the composition, and
(e) a protective layer on top of layer (d), wherein the maximum absorption wavelength of the silver nanoparticles in layer (d) is controlled by the amount of (surface) stabilizing agent(s) and optionally binder relative to the amount of silver nanoparticles, to be in the range of 700 to 1600 nm;

wherein the surface stabilizing agent(s) comprises a surface stabilizing agent of formula (I)

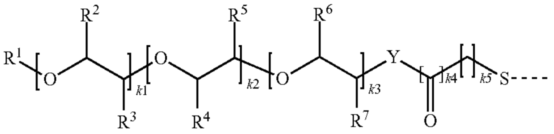

on their surface, wherein ---------- indicates the bond to the silver, $R^1$ is H, $C_1$-$C_{18}$alkyl, phenyl, $C_1$-$C_8$alkylphenyl, or $CH_2COOH$;

$R^2$, $R^3$, $R^4$, $R^5$, $R^6$ and $R^7$ are independently of each other H, $C_1$-$C_8$alkyl, or phenyl;

Y is O, or $NR^8$;

$R^8$ is H, or $C_1$-$C_8$alkyl;

k1 is an integer in the range of from 1 to 500, k2 and k3 are independently of each other 0, or integers in the range of from 1 to 250;

k4 is 0, or 1, and optionally a compound of formula (IIb)

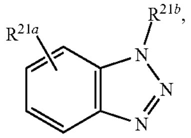

wherein $R^{21a}$ is a hydrogen atom, a halogen atom, a $C_1$-$C_8$alkoxy group, or a $C_1$-$C_8$alkyl group, $R^{21b}$ is a hydrogen atom, or a group of formula —$CHR^{24}$—$N(R^{22})(R^{23})$, $R^{22}$ and $R^{23}$ are independently of each other a $C_1$-$C_8$alkyl, a hydroxy$C_1$-$C_8$alkyl group, or a group of formula —$[(CH_2CH_2)—O]_{n1}$—$CH_2CH_2$—OH, wherein n1 is 1 to 5, $R^{24}$ is H or $C_1$-$C_8$alkyl; and optionally a compound of formula (IIc)

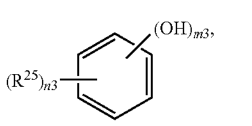

wherein $R^{25}$ can be the same, or different in each occurrence and is a hydrogen atom, a halogen atom, a $C_1$-$C_{18}$alkyl group, a $C_1$-$C_{18}$alkoxy group, or a group —C(=O)—$R^{26}$, $R^{26}$ is a hydrogen atom, a hydroxy group, a $C_1$-$C_{18}$alkyl group, unsubstituted or substituted amino group, unsubstituted or substituted phenyl group, or a $C_1$-$C_{18}$alkoxy group, and n3 is a number of 1 to 4, m3 is a number of 2 to 4, and the sum of m3 and n3 is 6.

2. The security element, according to claim 1, wherein the amount of (surface) stabilizing agent(s) relative to the amount of silver nanoparticles in layer d) is from 0.1 to 20% by weight of (surface) stabilizing agent(s) relative to the weight of silver nanoparticles.

3. The security according to claim 1, wherein the amount of binder relative to the amount of silver nanoparticles in layer d) is from 0 to 100% by weight binder relative to the weight of silver nanoparticles.

4. The security element, according claim 1, wherein the silver nanoparticles are in the form of platelets and have an average thickness of 5 to 30 nm and an average diameter of 20 to 70 nm and the maximum absorption wavelength of the silver nanoparticles is in the range of 600 to 1000 nm by varying the weight ratio of (surface) stabilizing agent(s) and optionally binder to silver nanoparticles in layer (d).

5. The security element, according to claim 1, wherein the silver nanoparticles are in the form of platelets and have an average thickness of 8 to 20 nm and an average diameter of 50 to 120 nm and the maximum absorption wavelength of the silver nanoparticles is in the range of 900 to 1600 nm by varying the weight ratio of (surface) stabilizing agent(s) and optionally binder to silver nanoparticles in layer (d).

6. The security element according to claim 1, wherein the composition comprises the binder and wherein the binder is selected from the group consisting of nitrocellulose, ethyl cellulose, cellulose acetate, cellulose acetate propionate (CAP), cellulose acetate butyrate (CAB), hydroxyethyl cellulose (HEC), hydroxypropyl cellulose (HPC), alcohol soluble propionate (ASP), vinyl chloride, vinyl acetate copolymers, vinyl acetate, vinyl, acrylic, polyurethane, polyamide, rosin ester, hydrocarbon, aldehyde, ketone, urethane, polythyleneterephthalate, terpene phenol, polyolefin, silicone, cellulose, polyamide, polyester, rosin ester resins, shellac and mixtures thereof.

7. The security element according to claim 1, wherein the metal layer b) consists of aluminum, or silver.

8. The security element according to claim 7, wherein the dielectric layer c) consists of aluminum oxide.

9. The security element according to claim 1, wherein the protective layer is derived from an UV lacquer which comprises an 10 to 60% by weight epoxy-acrylate and 20 to 88.99% by weight of one or more monofunctional or multifunctional acrylates and 1 to 15% by weight of one or more photoinitiators and 0.01 to 1% by weight of a levelling agent.

10. The security element according to claim 1, wherein the maximum absorption wavelength has a full width at half maximum within the range of 80 to 300 nm.

11. The security element according to claim 1, wherein layer (d) comprises areas which differ as to type of silver nanoparticles and/or different amounts of (surface) stabilizing agent(s) and optionally binder.

12. The security element according to claim 11, wherein the maximum absorption wavelength of the different areas is in the range of 700 to 800 nm, 800 to 900 nm and 900 to 1000 nm, respectively, or wherein the maximum absorption wavelength of the different areas is in the range of 700 to 800 nm, 800 to 900 nm and 900 to 1600 nm, respectively; and wherein the different areas optionally have a defined shape selected from the group consisting of a symbol, a stripe, a geometrical shape, a design, lettering, an alphanumeric character, the representation of an object and parts thereof.

13. A method of producing the security element according to claim 1, comprising the steps of a) providing a substrate having a surface, which surface optionally contains indicia or other visible features;

b) applying on top of at least part of the said substrate surface a metal layer having a thickness of from 5 to 1000 nm, c) optionally applying on at least part of the metal layer a dielectric layer having a thickness of 1 to 20 nm, d) applying on at least part of the metal layer, or the dielectric layer, a composition, comprising (i) silver nanoparticles having an average diameter of from 5 to 500 nm, (ii) a solvent, (iii) (surface) stabilizing agent(s), and (iv) optionally a binder, and curing and/or drying the composition, and e) applying a protective layer on top of layer d).

14. A product, comprising the security element according to claim 1.

15. A method of detecting the authenticity of the security element as defined in claim 1, comprising the steps of:

a) measuring an absorbance, reflectance or transmittance spectrum of the security document in the VIS/NIR range of the electromagnetic spectrum; and b) comparing the spectrum measured under a) and/or information derived therefrom with a corresponding spectrum and/or information of an authentic security element.

16. The security element according to claim 1, wherein the metal layer has a thickness from 10 to 500 nm, the dielectric layer has a thickness from 2 to 10 nm, the silver nanoparticles have an average diameter from 20 to 500 nm, and the maximum absorption wavelength of the silver nanoparticles in layer (d) is in the range from 750 to 1400 nm.

17. The security element according to claim 1, wherein in the composition in (d):

(i) the silver nanoparticles are present in an amount of 0.2 to 10% by weight, (ii) the solvent is present in an amount of 70 to 99.8% by weight, (iii) the surface stabilizing agent(s) is present in an amount of 0.005 to 2.5% by weight, and (iv) the optional binder is present in an amount of 0 to 5% by weight.

* * * * *